US 6,640,242 B1

(12) United States Patent
O'Neal et al.

(10) Patent No.: US 6,640,242 B1
(45) Date of Patent: Oct. 28, 2003

(54) VOICE ACCESS THROUGH A DATA-CENTRIC NETWORK TO AN INTEGRATED MESSAGE STORAGE AND RETRIEVAL SYSTEM

(75) Inventors: Stephen C. O'Neal, San Francisco, CA (US); George Alex Terry, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/239,589

(22) Filed: Jan. 29, 1999

(51) Int. Cl.[7] .............................................. G06F 13/00
(52) U.S. Cl. ...................... 709/206; 709/219; 709/328; 379/88.17; 370/401
(58) Field of Search ................... 370/352, 353, 370/354, 356, 401; 709/206, 217, 219, 313, 328, 329; 379/88.17, 88.18

(56) References Cited

U.S. PATENT DOCUMENTS

| 4,837,798 A | 6/1989 | Cohen et al. ................. 379/88 |
| 5,113,430 A | 5/1992 | Richardson, Jr. et al. ..... 379/88 |
| 5,127,003 A | 6/1992 | Doll, Jr. et al. .......... 370/110.1 |
| 5,136,634 A | 8/1992 | Rae et al. ................... 379/100 |
| 5,146,488 A | 9/1992 | Okada et al. ................. 379/88 |
| 5,333,266 A | 7/1994 | Boaz et al. ................. 395/200 |
| 5,351,276 A | 9/1994 | Doll, Jr. et al. ............... 379/67 |
| 5,353,336 A | 10/1994 | Hou et al. .................... 379/67 |
| 5,461,488 A | 10/1995 | Witek ......................... 358/402 |
| 5,475,738 A | 12/1995 | Penzias ........................ 379/67 |
| 5,479,411 A | 12/1995 | Klein ......................... 370/110 |
| 5,487,103 A | 1/1996 | Richardson, Jr. et al. ..... 379/88 |
| 5,497,373 A | 3/1996 | Hulen et al. .................. 370/79 |
| 5,530,740 A | 6/1996 | Irribarren et al. ............. 379/89 |
| 5,537,401 A | 7/1996 | Tadamura et al. ............ 370/60 |
| 5,608,786 A | 3/1997 | Gordon ....................... 379/100 |
| 5,633,916 A | 5/1997 | Goldhagen et al. ........... 379/67 |
| 5,646,981 A | 7/1997 | Klein ........................... 379/67 |
| 5,652,785 A | 7/1997 | Richardson, Jr. et al. ..... 379/88 |
| 5,675,507 A | 10/1997 | Bobo, II ................. 364/514 R |
| 5,732,126 A | 3/1998 | Fitzpatrick .................... 379/67 |
| 5,737,395 A | 4/1998 | Irribarren .................... 379/88 |
| 5,740,230 A | 4/1998 | Vaudreuil .................... 379/88 |
| 5,740,231 A | 4/1998 | Cohn et al. ................... 379/89 |
| 5,751,792 A | 5/1998 | Chau et al. ................... 379/89 |
| 5,781,614 A | 7/1998 | Brunson ...................... 379/88 |
| 5,793,762 A | 8/1998 | Penners et al. ............. 370/389 |
| 5,794,039 A | 8/1998 | Guck ......................... 395/683 |
| 5,796,394 A | 8/1998 | Wicks et al. ................ 345/329 |
| 5,799,063 A | 8/1998 | Krane ......................... 379/67 |
| 5,812,795 A | 9/1998 | Horovitz et al. ........ 395/200.75 |
| 5,822,405 A | 10/1998 | Astarabadi ................... 379/88 |
| 5,822,406 A | 10/1998 | Goldman et al. ............. 379/67 |
| 5,825,854 A | 10/1998 | Larson et al. ................ 379/67 |
| 5,844,969 A | 12/1998 | Goldman et al. ............. 379/67 |
| 5,848,415 A | 12/1998 | Guck ......................... 707/10 |
| 5,859,898 A | 1/1999 | Checco ................... 379/88.01 |
| 5,870,454 A | 2/1999 | Dahlen .................... 379/88.14 |

(List continued on next page.)

Primary Examiner—Viet D. Vu
(74) Attorney, Agent, or Firm—Senniger, Powers, Leavitt & Roedel

(57) ABSTRACT

An integrated message system receives and stores telephonic and data messages through a telephony-centric network and a data-centric network, respectively, and provides voice access through the data-centric network. As a result, the familiar message access of an ordinary telephony-centric network is provided through a data-centric network, e.g., the Internet. As a result, a user's messages can be retrieved via a voice interface through the Internet from anywhere in the world toll-free. In addition, the message system provides a gateway to the telephony-centric network, e.g., the public switched telephone network, such that the user can respond to messages from anywhere in the world through the Internet for the same toll charges that would accrue to the user for responding to the messages from home or the home office.

2 Claims, 21 Drawing Sheets

OTHER PUBLICATIONS

| | | | |
|---|---|---|---|
| 5,872,779 A | 2/1999 | Vaudreuil | 370/352 |
| 5,872,926 A | 2/1999 | Levac et al. | 395/200.36 |
| 5,878,117 A | 3/1999 | Minakami et al. | 379/88.01 |
| 5,884,262 A | 3/1999 | Wise et al. | 704/270 |
| 6,233,318 B1 * | 5/2001 | Picard et al. | 379/88.17 |
| 6,282,515 B1 * | 8/2001 | Speicher | 705/14 |
| 6,421,708 B2 * | 7/2002 | Bettis | 709/206 |

* cited by examiner

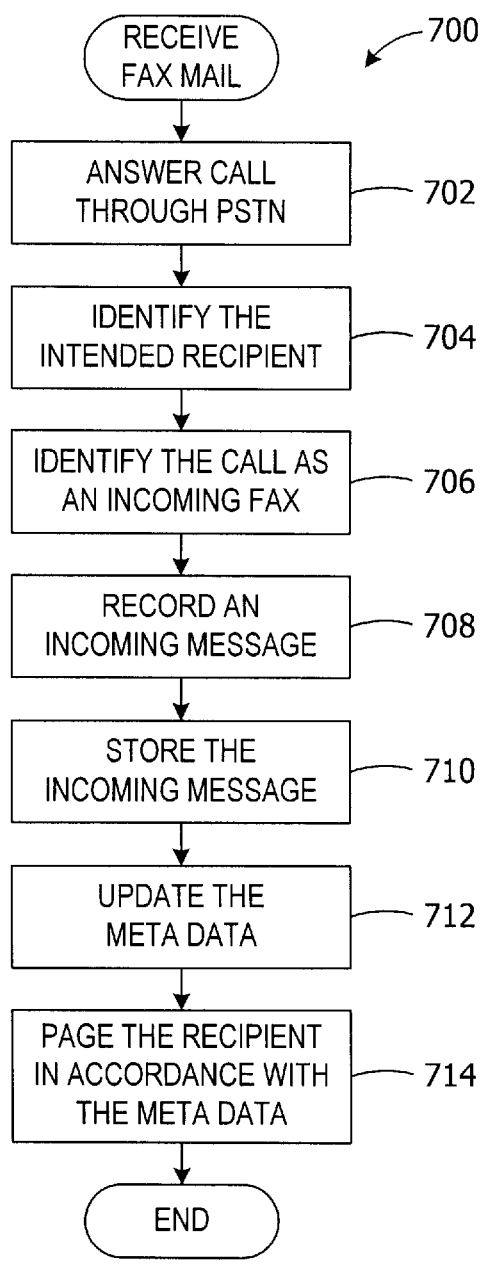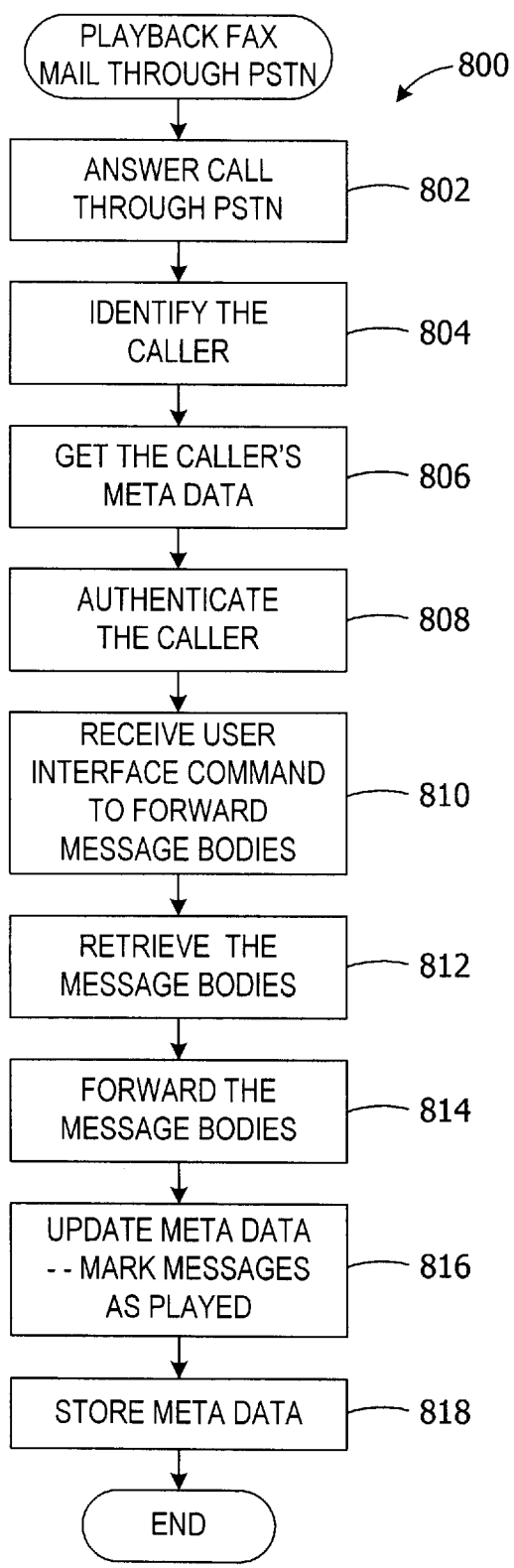

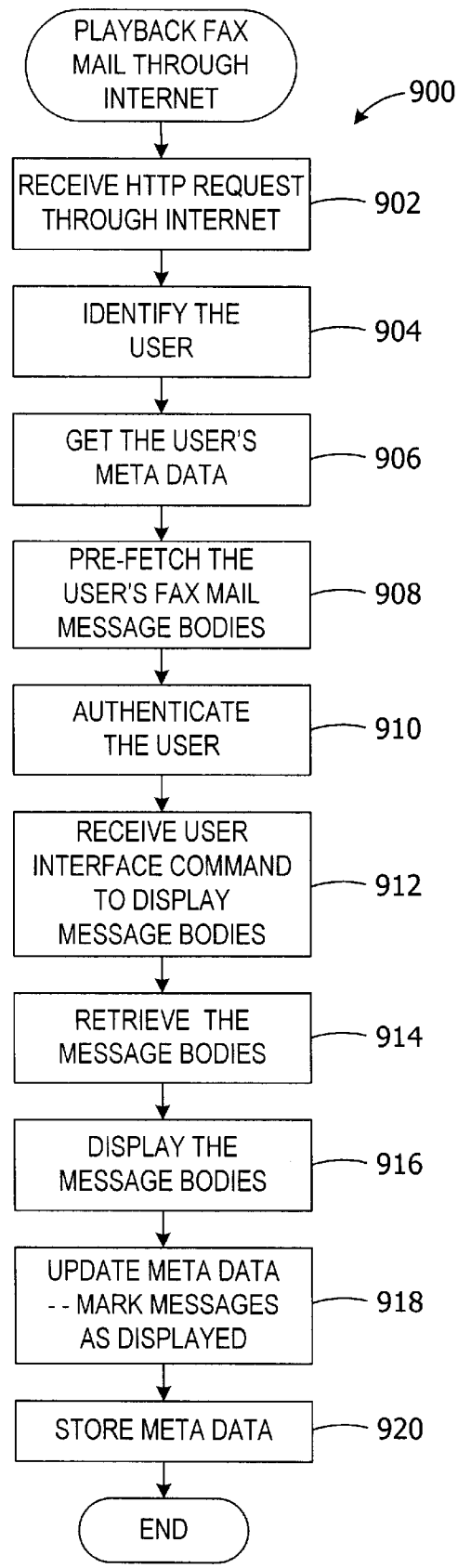

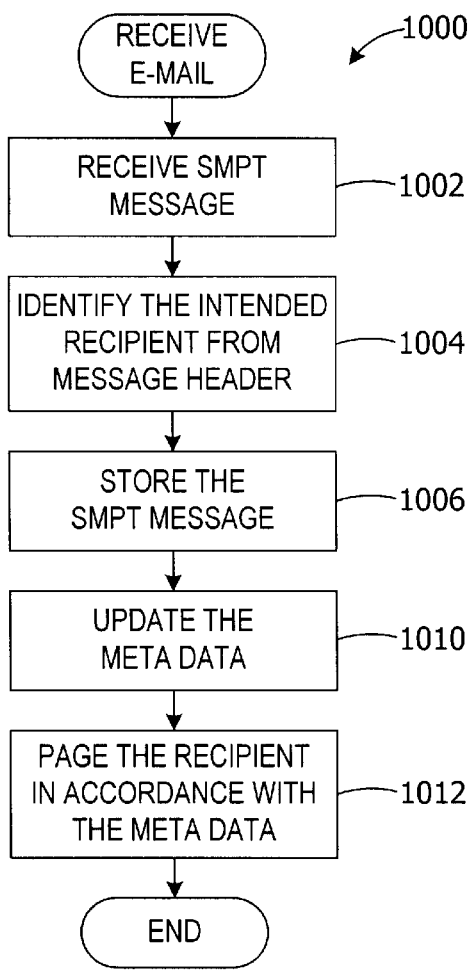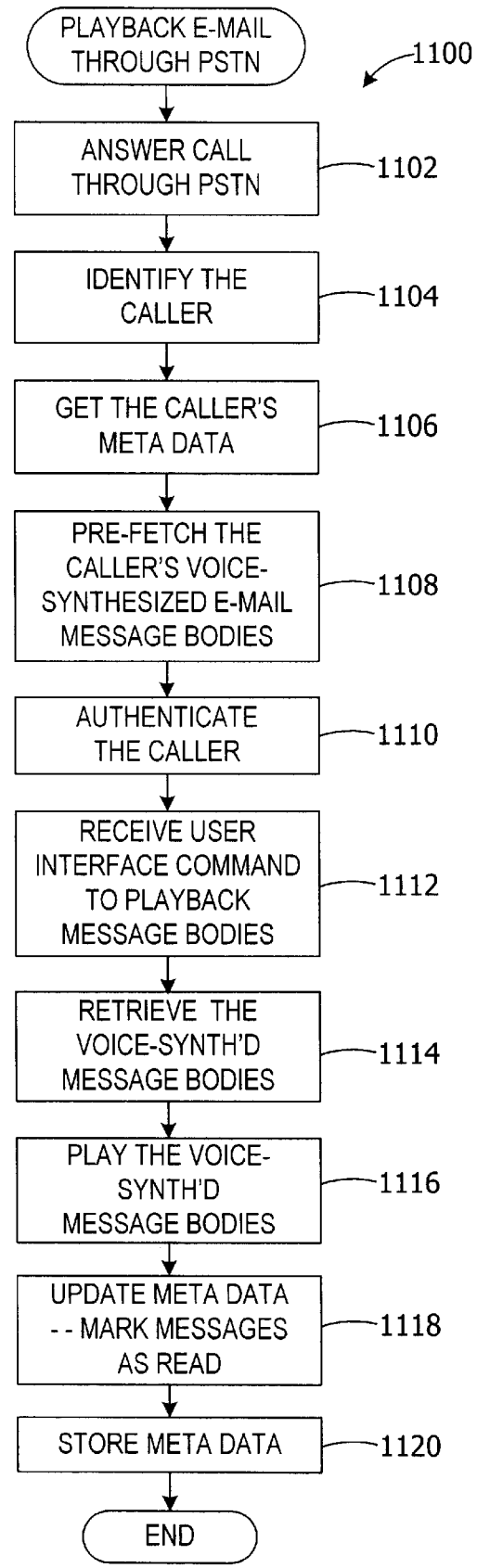

VOICE ACCESS THROUGH A DATA-CENTRIC NETWORK TO AN INTEGRATED MESSAGE STORAGE AND RETRIEVAL SYSTEM

CROSS REFERENCE TO RELATED APPLICATIONS

The present Application is related to the following U.S. Patent Applications, each of which is incorporated by reference in its entirety: (i) U.S. patent application Ser. No. 09/239,560 entitled "Integrated Message Storage and Retrieval System Distributed Over a Large Geographical Area" and filed Jan. 29, 1999 (now abandoned); (ii) U.S. patent application Ser. No. 09/240,367 entitled "A System And Method For Providing Unified Messaging to a User With a Thin Web Browser" and filed Jan. 29, 1999 (Issued Jun. 25, 2002 as U.S. Pat. No. 6,411,685); (iii) U.S. patent application Ser. No. 09/239,585 entitled "Centralized Communication Control Center for Visually and Audibly Updating Communication Options Associated with Communication Services of a Unified Messaging System And Methods Therefor" and filed Jan. 29, 1999 (Issued Jul. 17, 2001 as U.S. Pat. No. 6,263,064); (iv) U.S. patent application Ser. No. 09/239,584 entitled "Computer-implemented Call Forwarding Options And Methods Therefor in a Unified Messaging System" and filed Jan. 29, 1999 (Issued Oct. 8, 2002 as U.S. Pat. No. 6,463,145); (v) U.S. patent application Ser. No. 09/240,893 entitled "Interactive Billing System Utilizing a Thin Web Client Interface" and filed Jan. 29, 1999; (vi) U.S. patent application Ser. No. 09/240,368 entitled "A System And Method to Manage Phone Sourced Messages" and filed Jan. 29, 1999 (now abandoned); (vii) U.S. patent application Ser. No. 09/240,434 entitled "Method And Apparatus For Network Independent Initiation of Telephony" and filed Jan. 29, 1999; (viii) U.S. patent application Ser. No. 09/240,435 entitled "Apparatus And Method For Device Independent Messaging Notification" and filed Jan. 29, 1999; (ix) U.S. patent application Ser. No. 09/240,436 entitled "Apparatus and Method for Channel-transparent Multimedia Broadcast Messaging" and filed Jan. 29, 1999 (now abandoned).

FIELD OF THE INVENTION

The present invention relates to computer networks and, in particular, to a message system which integrates voice, fax, and electronic mail and which efficiently serves users of a particular large geographical area which generally includes two or more metropolitan regions.

BACKGROUND OF THE INVENTION

For several years now, people have been leaving voice messages recorded by telephone answering devices for intended telephone recipients. Since the earliest telephone answering devices, people have wanted remote access to their telephone messages, and numerous telephone answering devices have provided such remote access. More recently, facsimile transmission devices known commonly as fax machines have proliferated and are growing significantly in their use. Ever increasingly, attempted fax transmissions are finding busy signals. Accordingly, fax messages, in which a fax transmission is recorded remotely and subsequently transmitted to the intended receiver when available, are gaining in popularity. In addition to voice and fax mail, the popularity of electronic mail, i.e., e-mail, has grown tremendously in recent years. Thus, the means by which people receive messages from machines is growing significantly.

In addition, the mechanisms by which messages are stored and retrieved are generally independent of one another and accessed differently. For example, many people have telephone answering devices in their homes and/or offices to record telephone messages in their absence. Meanwhile, fax answering devices in the home or office are generally not useful since a fax machine can receive a transmission at any time. Accordingly, fax transmissions are generally recorded off site if the intended recipient fax machine is busy. Electronic mail generally never travels over telephone equipment, except perhaps for retrieval to a home computer through a dial-up connection to the Internet or other data-centric network, and is instead transmitted through a data-centric network. A data-centric network is a network which carries digital data, primarily to facilitate information exchange among computers and computer peripherals. Examples include distributed computer networks such as the Internet. By contrast, a telephony-centric network is a network which carries telephony information such as voice, fax, page messages encoded as dual tone multiple frequency (DTMF) signals, etc., primarily to facilitate information exchange among telephony devices. Telephony devices include such things as telephones, cellular telephones, pagers, and videophones.

What is needed is an integrated message system in which all messages, whether voice, fax, or e-mail, can be accessed using a single user interface and access medium.

SUMMARY OF THE INVENTION

In accordance with the present invention, an integrated message system receives and stores telephonic and data messages through a telephony-centric network and a data-centric network, respectively, and provides voice access through the data-centric network. As a result, the familiar message access of an ordinary telephony-centric network is provided through a data-centric network, e.g., the Internet. As a result, a user's messages can be retrieved via a voice interface through the Internet from anywhere in the world toll-free. In addition, the message system provides a gateway to the telephony-centric network, e.g., the public switched telephone network, such that the user can respond to messages from anywhere in the world through the Internet for the same toll charges that would accrue to the user for responding to the messages from home or the home office.

In particular, the message system receives a voice call through the Internet using any of a number of Internet voice connectivity applications currently available and responds to the voice call as if the voice call were received through the telephony-centric network. In addition, the message system provides a number of outgoing telephone lines which connect to the telephony-centric network and enable outbound telephone calls. By coupling the outbound telephone lines with an inbound voice connection through the data-centric network, the message system provides a gateway between the data-centric and telephony-centric networks and allows a single voice connection to be established through the data-centric network for retrieving one or more messages and responding to each of the one or more messages by placing outbound telephone calls on the telephony-centric network.

BRIEF DESCRIPTION OF THE DRAWINGS

FIG. 7 is a logic flow diagram of the receipt of a fax message through a telephony-centric network by the message system of FIG. 1.

FIG. 8 is a logic flow diagram of the retrieval of a fax message through a telephony-centric network from the message system of FIG. 1.

FIG. 9 is a logic flow diagram of the retrieval of a fax message through a data-centric network from the message system of FIG. 1.

FIG. 10 is a logic flow diagram of the receipt of a data message through a data-centric network by the message system of FIG. 1.

FIG. 11 is a logic flow diagram of the retrieval of a data message through a telephony-centric network from the message system of FIG. 1.

DETAILED DESCRIPTION

Figure 1:
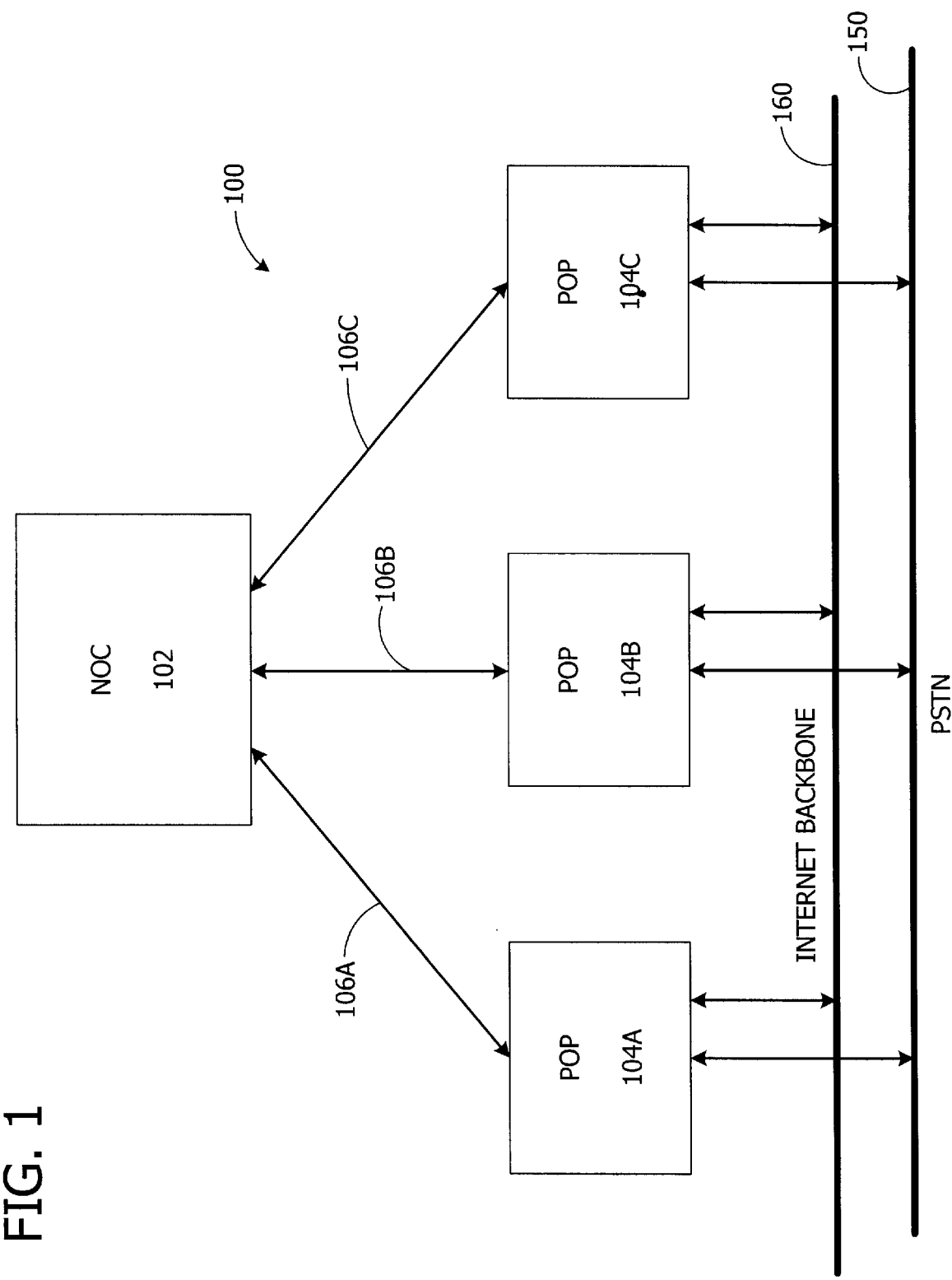
FIG. 1 is a block diagram of a message system in accordance with the present invention.

In accordance with the present invention, a message system 100 (FIG. 1) (i) receives messages from either a predominantly digital network, such as the Internet 160, or a predominantly analog/voice network, such as the public switched telephone network (PSTN) 150, (ii) stores such messages, and (iii) serves requests for retrieval of such messages through either network. For example, voice and fax messages are received through PSTN 150, and digitally represented electronic messages, e.g., e-mail messages, are received through Internet 160. Voice, fax, and e-mail messages can be retrieved from message system 100 through either Internet 160 or PSTN 150.

In particular, voice messages can be left through Internet 160, and messages of various types can be retrieved through Internet 160, using a virtual voice network (VVN) client. As used herein, a virtual voice network (VVN) client facilitates two-way voice communications through a predominantly digital network such as Internet 160. Examples of VVN clients currently available include Internet Phone voice communications software available from VocalTec, Inc. of Northvale, N.J. and CU See Me voice communication and video conference software available from White Pine Software Inc of Nashua, N.H. The use of VVN clients in message system 100 enables inexpensive, convenient to access and associates from anywhere in the world. The following example is illustrative.

Consider a business woman based in San Francisco, California is traveling, e.g., to Milan, Italy. As described in greater detail below, message system 100 allows a user to retrieve messages and establish telephone calls through VVN clients, e.g., VVN client 108A of POP 104A. Accordingly, the traveling businesswoman of our illustrative example can use a reciprocal VVN client to establish a voice connection between a computer in Milan, Italy and POP 104A through Internet 160. Once such a connection is established, the businesswoman can access her messages and can respond to such messages through POP 104A and PSTN 150 to various associates. Such responses take the form of an ordinary telephone call between POP 104A and the associates such that the called associates do not require VVN clients to receive such, calls. In general, the intended recipient of a voice connection through VVN clients must typically have a VVN client installed in their computer and the VVN client of the intended recipient must typically be running and have an established connection to Internet 160. By routing the telephone calls through POP 104A, the businesswoman of our example can avail herself of the economical option of a voice conversation through Internet 160 regardless of the nature and type of equipment in use by her intended recipients so long as her intended recipients have ordinary telephone equipment. In addition, integration of such a VVN client with message-system 100 allows the business woman to quickly and efficiently retrieve, and respond to, messages without requiring establishing multiple, separate voice connections to respond to each of a number of messages.

To facilitate understanding and appreciation of the present invention, message system 100 is described in some detail. Message system 100 (FIG. 1) (i) receives messages from either a data-centric network, such as the Internet 160, or a telephony-centric network, such as the public switched telephone network (PSTN) 150, (ii) stores such messages, and (iii) serves requests for retrieval of such messages through either network. For example, telephonic messages are received through PSTN 150, and data messages are received through Internet 160. Telephonic and data messages can be retrieved from message system 100 through either Internet 160 or PSTN 150 Telephonic messages are generally messages including substantive content which typically received through a telephony-centric network. Such messages include voice messages, fax messages, and audiovisual messages received through a teleconferencing device such as the ViaTV set-top video phone available from 8×8, Inc. of Santa Clara, Calif. Data messages are generally messages including digitally represented content which is typically transmitted through a data-centric network and includes, for example, e-mail and associated binary attachments.

Message-system 100 is designed to serve a large number of users distributed over a large geographical area. Message system 100 includes a-network operations center (NOC) 102 and a number of points of presence (POPs) 104A–C which are coupled to NOC 102 through respective connections 106A–C. Each of POPs 104A–C are directly analogous to one another. Accordingly, the following description of POP 104A is equally applicable to POPs 104B–C.

POP 104A is coupled to both Internet 160 and PSTN 150. As a result, POP 104A is accessible by computer through the Internet and by telephone. POP 104A is shown in greater detail in FIG. 2. A brief description of various components of POP 104A aids appreciation and understanding of message system 100 (FIG. 1). Such components are described in greater detail below.

POP 104A includes a local database 202 (FIG. 2) which includes data representing (i) telephonic and data messages, including for example voice mail messages, fax messages, e-mail messages, and page messages, and (ii) meta data representing the status of such messages. Such status of a particular message can include, for example, whether the message has been read, heard, forwarded, or deleted, to which category the message belongs, and for which user the message is intended. Categories of messages are represented to users as folders a well known organizational paradigm commonly used in conventional user interfaces. The meta data also represents specific characteristics of various users. Such characteristics can include, for example, a user's name, address, and telephone numbers, and various options which are selected by the user and which affect the particular behavior of message system 100 with respect to that particular user. Such options can include, for example, whether people leaving messages have the option to page the user, at which telephone number to page the user, whether fax messages are permitted to be received, and whether to alert the user of newly received messages with a page.

Voice point of presence (VPOP) 204 of POP 104A processes access to POP 104A through PSTN 150 (FIG. 1). VPOP 204 (FIG. 2) answers telephone calls received through PSTN 150, receives and recognizes user-generated control signals, sends and receives audio signals through PSTN 150, and initiates connections through PSTN 150 by issuing dialing signals thereto. User-generated control signals received and recognized by VPOP 204 can include (i) dual-tone multiple frequency (DTMW) signals generated by the user with end-user telephone equipment, e.g., by pressing of one or more buttons on a touch-tone telephone, and/or (ii) voice commands spoken by the user into the telephone handset.

Internet access to POP 104A is processed by World Wide Web (WWW) point of presence (WPOP) 206. WPOP 206 receives and serves requests for documents according to the hypertext transfer protocol (HTTP) of the World Wide Web of Internet 160. In this illustrative embodiment, a graphical user interface is implemented substantially entirely within WPOP 206 as multimedia documents, for example, in hypertext markup language (HTML), active server pages (ASP), and CGI (Common Gateway Interface) scripts and forms. This allows for improvements and enhancements in the graphical user interface and/or behavior of POP 104A as experienced by a user through Internet 160 without any software acquisition or installation by the user. Such significantly simplifies maintenance of POP 104A and shelters users from the inconvenience and responsibility of maintaining client software for message system 100. In addition, WPOP 206 implements the simple mail transfer protocol (SMTP) to send and receive e-mail messages through Internet 160. WPOP 206 further includes VVN client 108A to enable telephone-like access through Internet 160 in the manner described herein.

Audio streamer 208 of POP 104A streams audio playback of stored messages for playback through either VPOP 204 and PSTN 150 or WPOP 206 and Internet 160. In one embodiment, audio streamer 208 is the known and conventional RealAudio Player.

Figure 2:
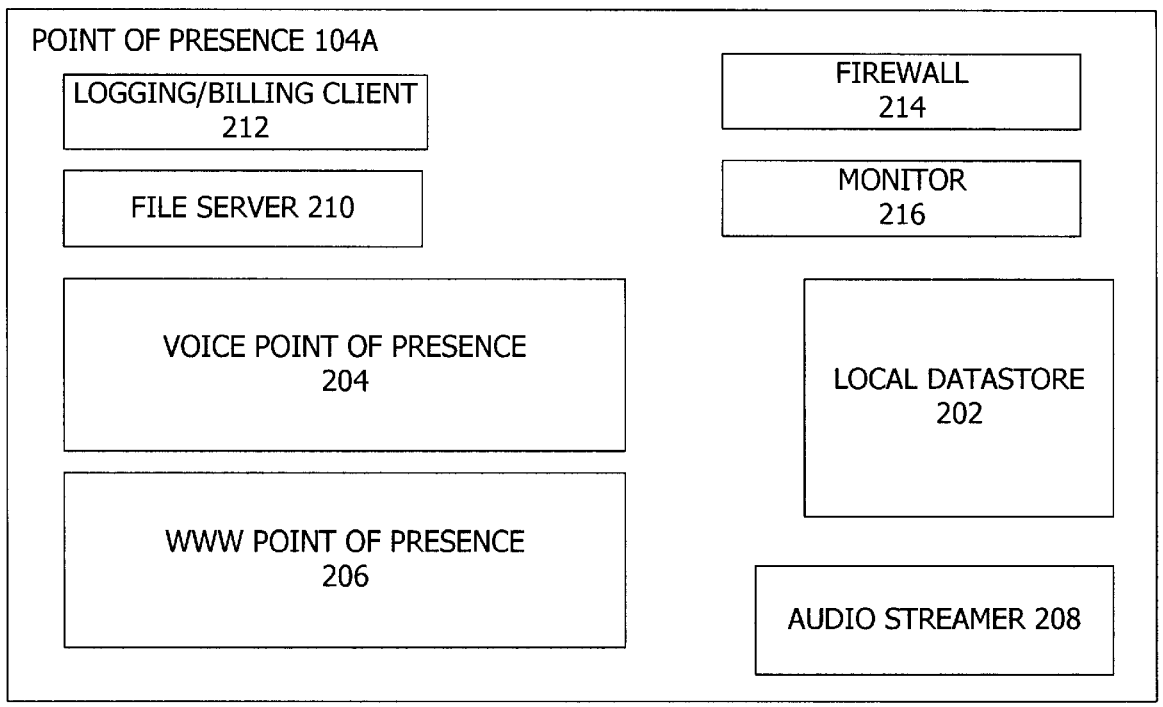
FIG. 2 is a block diagram of a POP of the message system of FIG. 1.

POP 104A includes a file server 210 includes a local database 202 which is accessible to NOC 102 (FIG. 1) through connection 106A. Firewall 214 (FIG. 2) ensures that file access requests and illegal requests received through Internet 160 or PSTN 150 are rejected. A logging and billing client 212 tracks outgoing telephone calls placed through VPOP 206 and sends to logging and billing system 306 (FIG. 3) and reports to users billing information with respect to a particular user's use of POP 104A (FIG. 2). A monitor 216 periodically queries components of POP 104A to verify that POP 104A is operating normally. If a particular component of POP 104A becomes inoperative, monitor 216 records the event and notifies a human operator. In addition, monitor 216 can attempt to restart all or part of POP 104A to resume normal operation.

NOC 102 (FIG. 1) is shown in greater detail in FIG. 3 and includes a number of components which are described briefly here and in greater detail below. NOC 102 includes a master database 302 which includes generally the same type of information described above with respect to local database 202 (FIG. 2). However, master database 302 (FIG. 3) replicates data stored in local database 202 (FIG. 2) and analogous local databases of POPs 104B–C. In one embodiment, NOC 102 retrieves the entire contents of local database 202 (FIG. 2) through file server 210 and the entire contents of analogous local databases of POPs 104B–C once per day, e.g., during off-peak usage hours such as early morning hours, and stores the contents in master database 302. In an alternative embodiment, NOC 102 retrieves such contents using spare bandwidth of connections 106A–C on an ongoing basis. In either embodiment, master database 302 provides a backup of contents of local database 202 (FIG. 2). In the embodiment shown in FIG. 1, master database 302 is generally not accessed directly by users. Alternative embodiments are described below.

NOC 102 includes a redirect web server 304. Redirect web server 304 is a web server but is rather limited. In particular, redirect web server 304 responds to requests for a base web page for all initial requests through Internet 160 for message system 100. The base web page includes a form by which a user can specify a username and a password. In response to such a request, redirect web server 304 determines, by reference to data stored in master database 302, with which of POPs 104A–C the user is associated. For each user of message system 100, a single one of POPs 104A–C is considered local. Such is true since VPOP 204 (FIG. 2) is accessed through PSTN 150 and is preferably accessed through a local, non-toll telephone call. Master database 302 (FIG. 3) contains data specifying which of POPs 104A–C is local for each user as identified by a username. By retrieving such data associated with the username entered by the user on the base web page, redirect web server 304 determines which of POPs 104A–C is local to the user. Redirect web server 302 redirects the user to the WWW point of presence of the local POP, e.g., WPOP 206 (FIG. 2) of POP 104A, which then receives and serves any additional HTTP requests generated by the user.

NOC 102 further includes a logging and billing system 306 which logs use of message system 100 (FIG. 1.) by each user, which receives usage logs of such users for appurtenant services, e.g., long distance telephone service, and which generates therefrom bills for such usage for each user. In addition, NOC 102 includes a firewall 308 and a monitor 310 which are directly analogous to firewall 214 and monitor 216, respectively.

Message system 100 (FIG. 1) performs a number of basic functions related to message storage and retrieval. In particular, voice, fax, and electronic messages are processed in an integrated fashion. For each type message, there are three primary functions: (1) receipt and storage of the message, (2) retrieval of the stored message through PSTN 150, and (3) retrieval of the stored message through Internet 160. Each of these functions is described below to provide a general understanding and appreciation for the overall operation of message system 100.

Voice Mail

Figure 4:
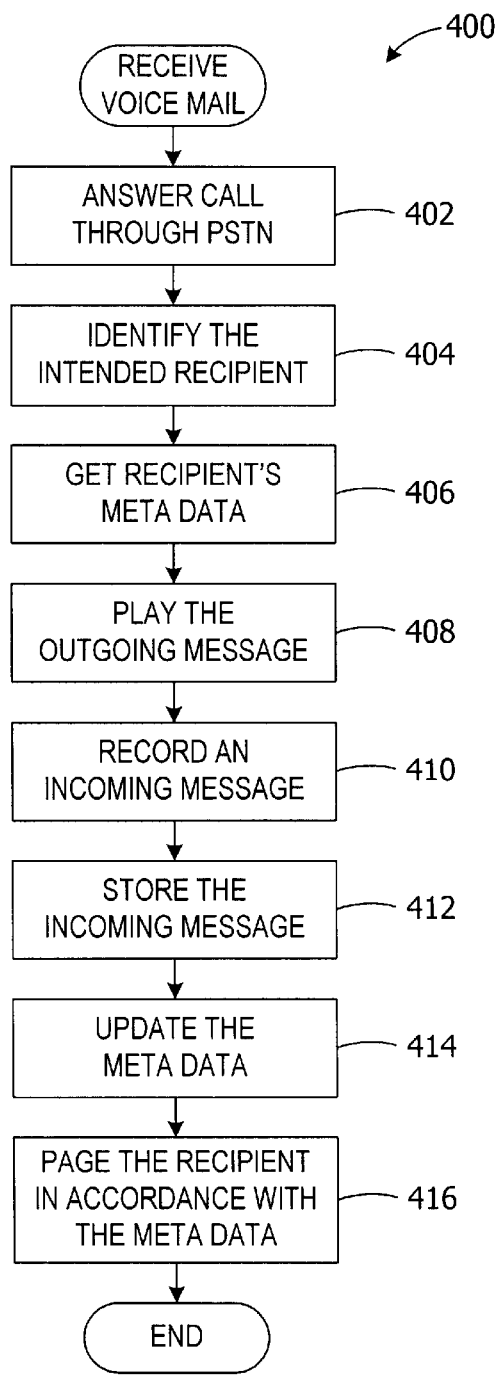
FIG. 4 is a logic flow diagram of the receipt of a telephonic message through a telephony-centric network by the message system of FIG. 1.

Logic flow diagram 400 (FIG. 4) shows the receipt and storage of voice messages by message system 100 (FIG. 1). In step 402 (FIG. 4), VPOP 204 (FIG. 2) answers a telephone call through PSTN 150. VPOP 204 determines for which user the call is intended in step 404 (FIG. 4). VPOP 204 (FIG. 2) makes such a determination by reference to the telephone number which was dialed. In this illustrative embodiment, each user of message system 100 has two unique telephone numbers by which message system 100 is accessed. The first is referred to as a local access number and is a local telephone number by which POP 104A is reached. The second is referred to as a toll-free access number and is a toll-free telephone number by which POP 104A is reached. The toll-free access number is toll-free to the caller; any charges incurred by use of the toll-free access number accrue to the owner of the toll-free access number, i.e., the user to whom the toll-free access number is allocated. Since each telephone number is unique to a particular user, the telephone number dialed identifies the user whom the caller is attempting to reach. That user is referred to as the subject user in the context of logic flow diagram 400 (FIG. 4).

In step 406, VPOP 204 (FIG. 2) retrieves meta data for the subject user from local database 202. Such meta data includes an outgoing message which is, in this illustrative example, an audio signal which directs the caller to leave a voice message for the subject user. VPOP 204 plays the outgoing message to the caller through PSTN 150 in step 408 (FIG. 4). In step-410, VPOP 204 (FIG. 2) records a message for the subject user as received through PSTN 150. VPOP 204 stores the message digitally, e.g., as a digitized audio signal in the known, conventional VOX format, in local database 202 in step 412 (FIG. 4). In addition, VPOP 204 (FIG. 2) updates meta data stored in local database 202 such that the received message is included in a list of new messages for the subject user. Such meta data can include the number of new voice messages for the subject user, a date and time at which the message was received, caller identification data, and the length of the message.

In step 416 (FIG. 4), the subject user is paged if meta data stored in local database 202 (FIG. 2) specifies that the subject user is to be immediately alerted to the received message. Such meta data can specify if any messages are to generate such an alert and can specify specific characteristics of messages for which the subject user is to be alerted. VPOP 204 pages the subject user by dialing through PSTN 150 a telephone number of a pager worn by the subject user and by further entering a numeric or an alphanumeric message indicating receipt of a new message for the subject user. The specific telephone number to be dialed for so alerting the subject user is included in the meta data for the subject user stored in local database 202.

Figure 3:
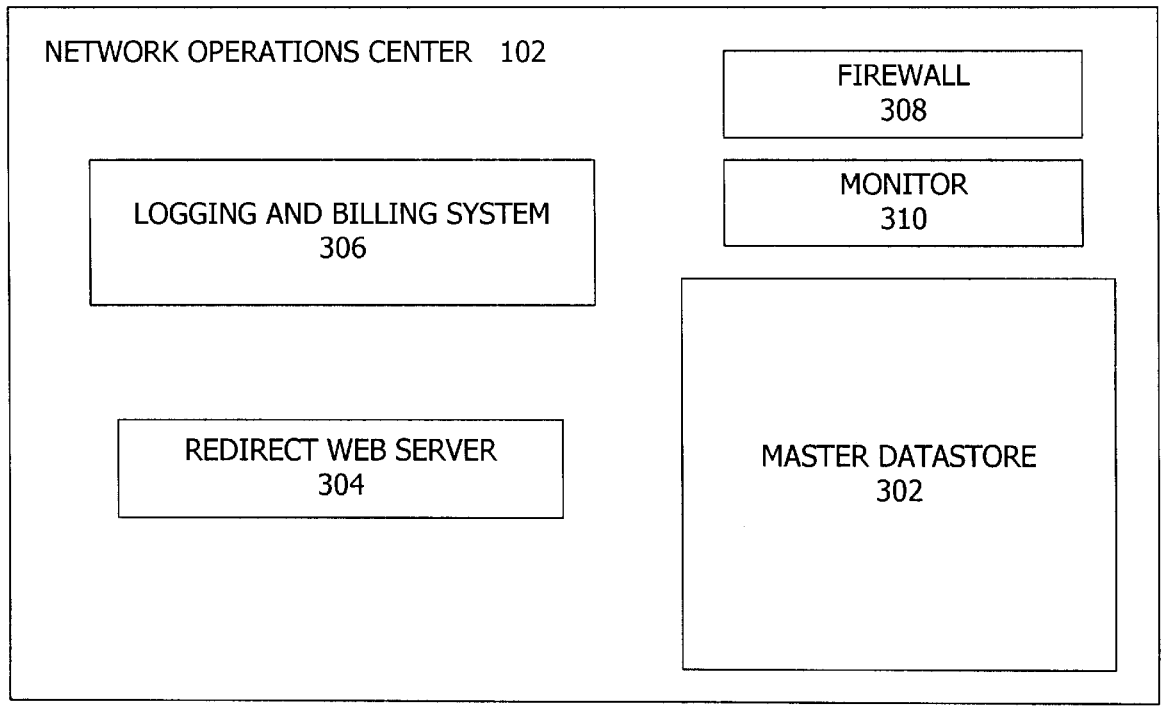
FIG. 3 is a block diagram of a NOC of the message system of FIG. 1.

In the embodiment shown in FIGS. 1–3, the message is retrieved from local database 202 whether such retrieval is through PSTN 150 or Internet 160. Accordingly, the message is immediately available for retrieval and copying of the message to master database 302 (FIG. 3) for backup and/or archival purposes can be postponed until bandwidth is available over connection 106A (FIG. 1) or until some predetermined off-peak time.

Retrieval of the message through PSTN 150 is illustrated by logic flow diagram 500 (FIG. 5) in which processing-begins instep 502. In step 502, VPOP 204 (FIG. 2) answers a telephone call through PSTN 150. In step 504 (FIG. 5), VPOP 204 (FIG. 2) identifies the caller. In this illustrative embodiment, a user checks messages by dialing either the user's local access number or the user's toll-free access number and presses a particular button on a touch-tone telephone, e.g., the asterisk button, to initiate message retrieval. In response to the DTMF signal of the asterisk button, VPOP 204 uses the number by which VPOP 204 is accessed through PSTN 150 to identify the caller.

Figure 5:
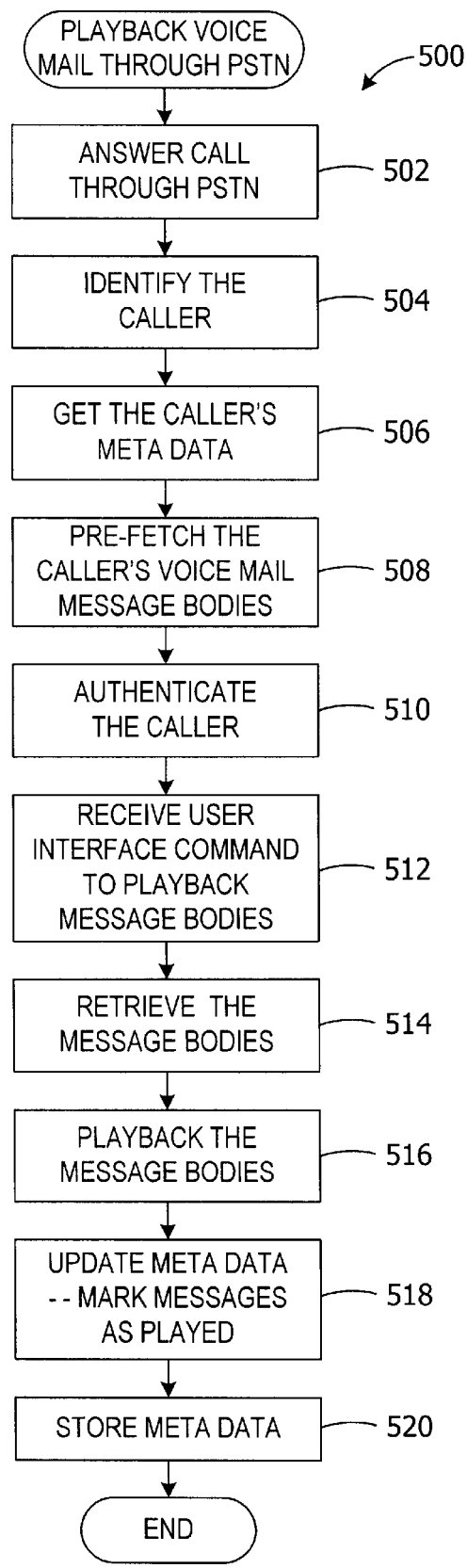
FIG. 5 is a logic flow diagram of the retrieval of a telephonic message through a telephony-centric network from the message system of FIG. 1.

Once the caller is identified, VPOP 204 retrieves meta data pertaining to the caller from local database 202 in step 506 (FIG. 5). The meta data includes data specifying the user's passcode and the number of new voice mail messages, i.e., the number of voice mail messages which have been received but not previously retrieved by the caller. In step 508, VPOP 204 (FIG. 2) initiates a pre-fetch of the caller's voice mail message bodies. In this embodiment, pre-fetching message bodies improves performance only slightly, if at all, since the message bodies are stored locally in local database 202 and are readily available to VPOP 204. However, such pre-fetching provides significant improvements in performance in alternative architectures which are described below.

In step 510 (FIG. 5), VPOP 204 (FIG. 2) authenticates the caller. In particular, the caller enters a numerical passcode by pressing a number of touch-tone buttons on a telephone in a predetermined sequence to send DTMF signals through PSTN 150 to VPOP 204. The caller is authenticated by comparing the sequence of pressed buttons as represented by DTMF signals to the passcode of the caller's meta data and determining that the sequence matches the meta data passcode.

Once the user is authenticated, VPOP 204 allows the user to enter commands by pressing touch-tone buttons or by peaking voice commands and navigating an audio user interface which includes menus of audio voice prompts. To playback voice mail messages, the user ultimately enters a command selecting voice mail and directing that VPOP 204 play back any new voice mail messages in step 512 (FIG. 5). In step 514, VPOP 204 (FIG. 2) completes retrieval of the new message bodies from local database 202.

In step 516 (FIG. 5), VPOP 204 (FIG. 2) plays the retrieved message bodies to the caller through PSTN 150 and can include audio representation of meta data such as the date and time at which the message was recorded. In step 518 (FIG. 5), VPOP 204 (FIG. 2) updates meta data associated with the played message body within local database 202 to indicate that the message has been played for the caller. The caller can issue additional commands to cause VPOP 204 to delete the message, to associate the message with a particular folder of voice mail messages or to save the voice mail message and play the next. When the caller is finished with a particular message, VPOP 204 stores the updated meta data for the played message in local database 202. Thus, voice mail is retrieved through PSTN 150 from POP 104A.

Logic flow diagram 600 (FIG. 6) illustrates retrieval of voice mail messages through Internet 160 (FIG. 1). In step 602 (FIG. 6), redirect web server 304 (FIG. 3) receives a HTTP request for a base web page through Internet 160. Redirect web server 304 displays a base web page which includes a form in which the user enters a username and an associated password. In step 604 (FIG. 6), redirect web server 304 (FIG. 3) receives a username and associated password entered by the user and uses the received username to identify the user. In identifying the user, redirect web server 304 identifies POP 104A (FIG. 1) as the POP local to the user and redirects the user to WPOP 206 (FIG. 2) of POP 104A. Redirect web server 304 (FIG. 3) identifies POP 104A as the local POP by reference to meta data associated with the user and stored within master database 302. Subsequent HTTP or other Internet protocol requests initiated by the user are thereafter received and processed by WPOP 206 (FIG. 2).

In step 606 (FIG. 6), WPOP 206 (FIG. 2) retrieves meta data associated with the identified user from local database 202. In addition, in step 608 (FIG. 6), WPOP 206 (FIG. 2) initiates a pre-fetch of voice mail message bodies from local database 202 in the manner described above with respect to step 508 (FIG. 5). In step 610 (FIG. 6), WPOP 206 (FIG. 2) authenticates the user in the manner described above with respect to step 510, (FIG. 5) but instead using the password entered in the manner described above with respect to step 604 (FIG. 6). In particular, WPOP 206 (FIG. 2) compares the password entered by the user in the base web page to a password stored in the user's meta data in local database 202 and authenticates the user upon determination that the two match.

Figure 6:
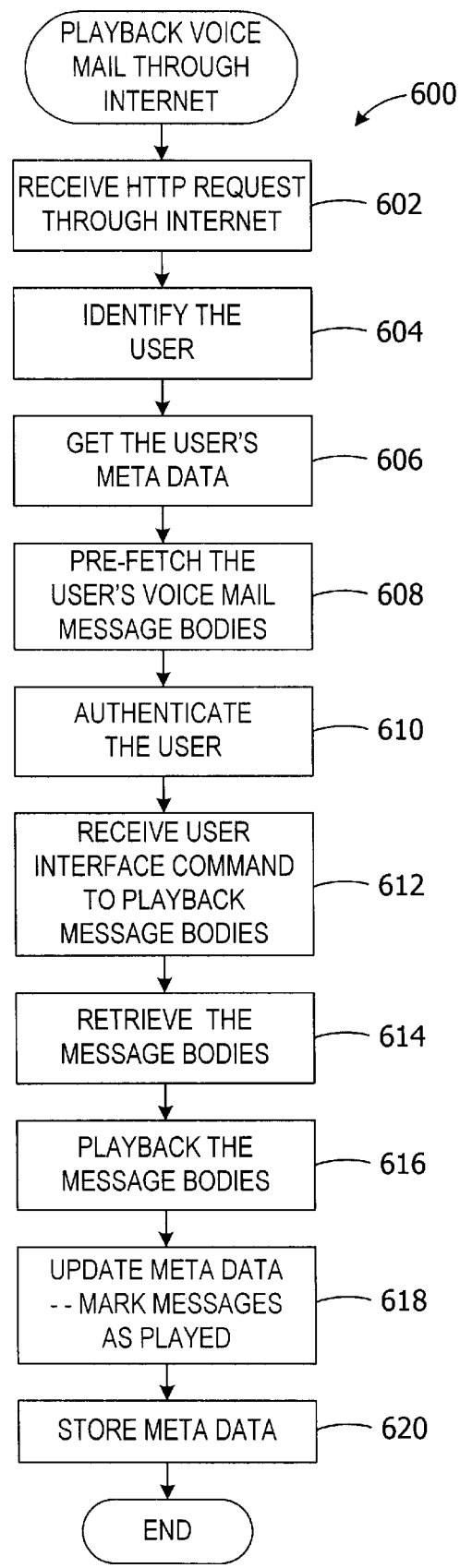
FIG. 6 is a logic flow diagram of the retrieval of a telephonic message through a data-centric network from the message system of FIG. 1.

WPOP 206 receives user interface commands to playback one or more voice mail messages in step 614 (FIG. 6). In this illustrative embodiment, the user interface implemented by WPOP 206 (FIG. 2) includes a number of web pages which include forms which in turn execute CGI scripts to carry out specific commands entered by the user.

In step 616 (FIG. 6), WPOP 206 (FIG. 2) completes retrieval of the message bodies in the manner described above with respect to step 516 (FIG. 5). As described above, the message bodies are stored as digitized audio signals, e.g., in the known and conventional VOX format.

Once the voice message bodies are retrieved, WPOP 206 (FIG. 2) plays the voice mail message bodies for the user through Internet 160 in step 618 (FIG. 6). Specifically, WPOP 206 (FIG. 2) sends the voice mail message bodies to audio streamer 208 which then streams the audio signal of each voice mail message through Internet 160 to the user which is received by a conventional client computer system and played back using known and conventional techniques for playback of digitized audio signals in a computer system. Once the message bodies are played, WPOP 206 marks each message body as played to the user as represented in meta data stored within local database 202 in step 620 (FIG. 6). In addition, the user can issue commands which cause the message body to be deleted or to be moved to a specific folder or to be associated with a textual summary. Such changes in the meta data associated with each message body is updated in step 620. In step 622, WPOP 206 (FIG. 2) stores the meta data as updated in local database 202.

Thus, voice mail messages can be retrieved from local database 202 through Internet 160. The ability to retrieve voice mail messages through Internet 160 while such voice messages are received by message system 100 (FIG. 1) through PSTN 150 gives a user significant flexibility and convenience. For example, a user can retrieve voice messages left at the user's home or office from virtually anywhere in the world for no more cost than access to the World Wide Web. For much of the world, such access is increasingly available for little or no cost. In other words, a person's voice mail messages are always as close and as inexpensive as the nearest and cheapest access to the Internet.

Fax Mail

Logic flow diagrams 700 (FIG. 7), 800 (FIG. 8), and 900 (FIG. 9), respectively, illustrate receipt and storage of fax mail, retrieval of fax mail by telephone, and retrieval of fax mail through Internet 160 (FIG. 1). As described above with respect to voice mail messages, VPOP 204 (FIG. 2) receives and stores fax mail messages and facilitates retrieval of fax mail messages through PSTN 150 while WPOP 206 facilitates retrieval of fax mail messages through Internet 160.

In step 702 (FIG. 7), VPOP 204 (FIG. 2) answers a telephone call through PSTN 150 or through Internet 160 in conjunction with VVN client 108A. VPOP 204 identifies the user for whom the call is intended by comparison of the telephone number by which VPOP 204 is reached to access numbers of various users as represented in local database 202 in step 704 (FIG. 7). The intended recipient of the fax is sometimes referred to as the subject user in the context of logic flow diagram 700. VPOP 204 (FIG. 2) further identifies the call received through PSTN 150 as an incoming fax in step 706 (FIG. 7) by recognizing distinctive tones generated by fax machine to identify telephone calls as such. Such identification is conventional and uses standard techniques.

In step 708 (FIG. 7), VPOP 204 (FIG. 2) receives the fax as would any conventional fax machine, i.e., according to standard fax transmission protocols. VPOP 204 stores the received fax in local database 202 in step 710 (FIG. 7) as a fax mail message. VPOP 204 (FIG. 2) updates meta data associated with the subject user within database 202 in step 712 (FIG. 7) to indicate that an additional new fax mail message has been received for the subject user. In addition, VPOP 204 (FIG. 2) pages the subject user in step 714 (FIG. 7) if meta data stored in local database 202 (FIG. 2) indicates that the subject user should be notified of newly arriving fax mail messages.

Thus, a fax mail message is received, either through the subject user's local access number or the subject user's toll-free access number, and is stored in local database 202 according to logic flow diagram 700 (FIG. 7).

Logic flow diagram 800 (FIG. 8) illustrates retrieval of such a fax mail message through PSTN 150 (FIG. 1) by dialing either the local or toll-free access number of the subject user. In step 802 (FIG. 8), VPOP 204 (FIG. 2) answers a telephone call received through PSTN 150 according to either the local or toll-free access number of the subject user. VPOP 204 (FIG. 2) identifies the subject user by the particular telephone number by which POP 104A is accessed through PSTN 150 in the manner described above with respect to step 504 (FIG. 5).

In step 806 (FIG. 8), VPOP 204 (FIG. 2) retrieves from local database 202 meta data associated with the subject user which can include, for example, data representing the number of fax mail messages stored for the subject user, the number of new fax mail messages, and pointers to the fax mail message bodies stored in local database 202. In addition, such meta data can include data specifying the date and time each fax mail message was recorded and subject data describing the content of each such fax mail message if such data has been entered by the user.

VPOP 204 authenticates the caller as the subject user in step 808 (FIG. 8) in the manner described above with respect to 510 (FIG. 8). Once the caller is authenticated as the subject user, VPOP 204 (FIG. 2) receives one or more user generated commands entered through the audio user interface described above with respect to retrieval of voice mail messages. In step 810 (FIG. 8), VPOP 204 (FIG. 2) recognizes a user-generated command which directs that a particular fax mail message be forwarded to a particular telephone number. The telephone number can be stored in the subject user's meta data as the primary fax number for the subject user or can be specified by the user using an audio user interface, e.g., voice commands, and/or DTMF signals entered using a telephone's keypad. In step 812 (FIG. 8), VPOP 204 (FIG. 2) retrieves fax mail message bodies for the one or more faxes to be forwarded. VPOP 204 sends the fax mail message bodies to the specified fax telephone number according to known, standard fax transmission protocols such that the previously stored fax message bodies are received and printed on the specified fax machine.

In step 816 (FIG. 8), VPOP 204 (FIG. 2) updates the meta data associated with the subject user to indicate that the forwarded fax mail messages have been retrieved. VPOP 204 stores the updated meta data in local database 202 in step 818 (FIG. 8). Thus, VPOP 204 (FIG. 2) facilitates retrieval of previously stored fax mail messages in accordance with logic flow diagram 800.

Logic flow diagram 900 (FIG. 9) illustrates retrieval of fax mail messages through Internet 160. In steps 902–910, redirect web server 304 (FIG. 3) receives a HTTP request for a base web page, identifies the user, and redirects the user to WPOP 206 (FIG. 2) which initiates pre-fetching of new fax mail message bodies, retrieves the user's meta data from local database 202 and authenticates the user all in the manner described above with respect to steps 602–610 (FIG. 6). In step 912 (FIG. 9), WPOP 206 (FIG. 2) receives user commands directing display of one or more fax mail message bodies. In step 914 (FIG. 9), WPOP 206 (FIG. 2) retrieves those fax mail message bodies. WPOP 206 converts the retrieved fax mail message bodies from a fax format to a graphical image format, e.g., the known and standard GIF and/or TIFF formats, and sends the retrieved and converted fax message bodies through Internet 160 for display to the user. Thus, the user is able to view the substantive content of fax mail messages through Internet 160.

In step 918 (FIG. 9), WPOP 206 (FIG. 2) marks the retrieved fax mail messages as read within local database 202 and further updates meta data for the user, e.g., to reflect a change in the number of unviewed fax mail messages. WPOP 206 stores the updated meta data in local database 202 in step 920 (FIG. 9).

E-Mail

Logic flow diagrams 1000 (FIG. 10), 1100 (FIG. 11), and 1200 (FIG. 12), respectively, illustrate receipt and storage of electronic mail (e-mail), retrieval of e-mail by telephone, and retrieval of e-mail through Internet 160 (FIG. 1). WPOP 206 (FIG. 2) receives and stores e-mail messages and facilitates retrieval of e-mail messages through Internet 160 while VPOP 204 facilitates retrieval of e-mail messages through PSTN 150.

In step 1002 (FIG. 10), WPOP 206 (FIG. 2) receives an e-mail message through Internet 160. The e-mail message comports with and is received according to the simple mail transfer protocol (SMTP). In step 1004 (FIG. 10), WPOP 206 (FIG. 2) identifies the intended recipient of the e-mail message according to the e-mail address to which the message is addressed. WPOP 206 stores the e-mail message in local database 202 in step 1006 (FIG. 10) and associates the e-mail message with the intended recipient within local database 202 (FIG. 2).

In step 1008 (FIG. 10), a voice synthesized audio version of the e-mail message is formed and stored in local database 202 (FIG. 2). The audio version of the message facilitates retrieval of the e-mail message through PSTN as described more completely below. In one embodiment, step 1008 (FIG. 10) is postponed until the audio version is requested, e.g., as part of the step of pre-fetching described more completely below as step 1108 (FIG. 11). In step 1010 (FIG. 10), WPOP 206 (FIG. 2) updates the meta data associated with the intended recipient to increment the number of new e-mail messages and to include data representing the sender of the e-mail message, the date and time of sending (or, alternatively, the receipt) of the message, the subject of the message as specified in the messages header, and the size of the message. In addition, VPOP 204 (FIG. 2) pages the intended recipient of the e-mail message in step 1012 (FIG. 10) if meta data stored in local database 202 (FIG. 2) indicates that the intended recipient should be notified of newly arriving e-mail messages.

Thus, an e-mail message is received, through Internet 160 and is stored in local database 202 according to logic flow diagram 1000 (FIG. 10).

Figure 12:
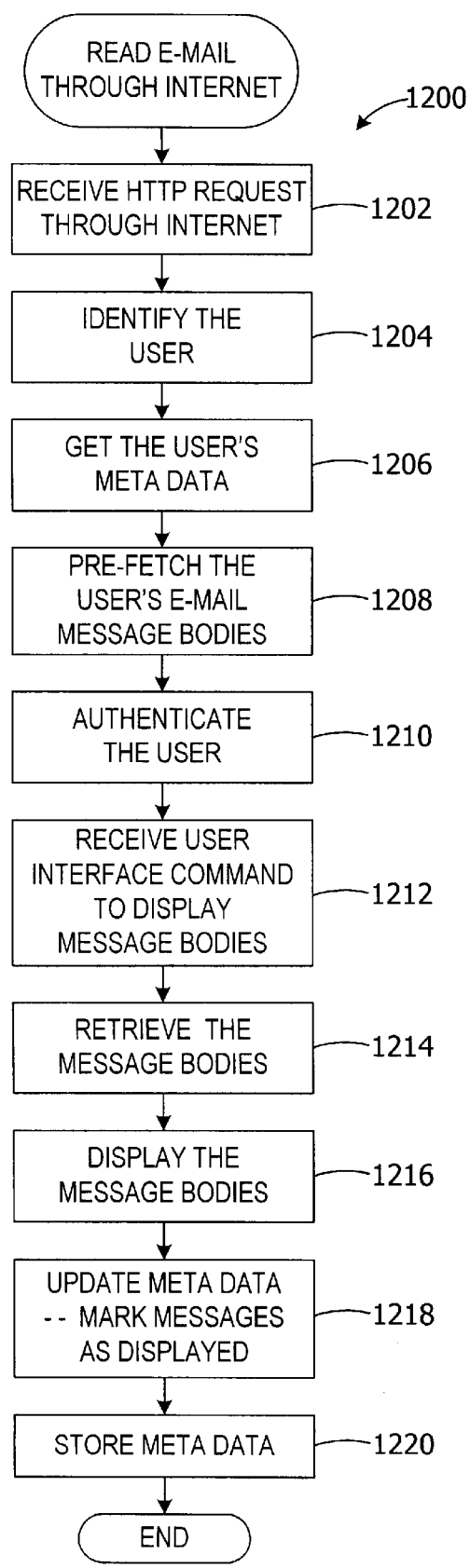
FIG. 12 is a logic flow diagram of the retrieval of a data message through a data-centric network from the message system of FIG. 1.

Logic flow diagram 1100 (FIG. 11) illustrates retrieval of such an e-mail message through PSTN 150 (FIG. 1) by dialing either the local or toll-free access number of the user to which the e-mail message is addressed, which is sometimes referred to as the subject user in the context of logic flow diagrams 1100 (FIG. 11) and 1200 (FIG. 12). In step 1102 (FIG. 11), VPOP 204 (FIG. 2) answers a telephone call received through PSTN 150 according to either the local or toll-free access number of the subject user. VPOP 204 identifies the subject user by the particular telephone number by which POP 104A is accessed through PSTN 150 in the manner described above with respect to step 504 (FIG. 5).

In step 1106 (FIG. 11), VPOP 204 (FIG. 2) retrieves from local database 202 meta data associated with the subject user which can include, for example, data representing the number of e-mail messages stored for the subject user, the number of new e-mail messages, and pointers to the e-mail message bodies stored in local database 202. In addition, such meta data can include the meta data stored in step 1010 (FIG. 10) as described above.

In step 1108 (FIG. 11), VPOP 204 (FIG. 2) initiates a pre-fetch of voice synthesized audio versions of new e-mail messages stored in local database 202. Such pre-fetching can include generation of the voice synthesized audio version of the e-mail messages. The audio version includes voice synthesized audio equivalents of the message body and a number of fields of the e-mail message meta data including, for example, the subject of the message as indicated in the header and the sender of the message.

VPOP 204 authenticates the caller as the subject user in step 1110 (FIG. 11) in the manner described above with respect to step 510 (FIG. 5). Once the caller is authenticated as the subject user, VPOP 204 (FIG. 2) receives one or more user-generated commands entered through the audio user interface described above with respect to retrieval of voice mail messages. Such user interface can include listing e-mail message meta data such as the sender and subject of each message. To list such information to the caller, voice synthesized audio versions of such meta data are played for the caller over PSTN 150. In step 1112 (FIG. 11), VPOP 204 (FIG. 2) recognizes a user-generated command which directs that a particular e-mail message be played to the caller through PSTN 150. In step 1114 (FIG. 11), VPOP 204 (FIG. 2) retrieves the audio versions of the e-mail message bodies for the one or more e-mail message to be played. VPOP 204 plays the audio versions of the e-mail message bodies through PSTN 150 to the caller in step 1116 (FIG. 11).

In step 1118, VPOP 204 (FIG. 2) updates the meta data associated with the subject user to indicate that the e-mail messages have been retrieved and read by the subject user. VPOP 204 stores the updated meta data in local database 202 in step 1120 (FIG. 11). Thus, VPOP 204 (FIG. 2) facilitates retrieval of previously stored e-mail messages in accordance with logic flow diagram 1100 (FIG. 11).

Logic flow diagram 1200 (FIG. 12) illustrates retrieval of e-mail messages through Internet 160 (FIG. 1). In steps 1202–1210 (FIG. 12), redirect web server 304 (FIG. 3) receives a HTTP request for a base web page, identifies the user, and redirects the user to WPOP 206 (FIG. 2) which initiates pre-fetching of new fax mail message bodies, retrieves the user's meta data from local database 202 and authenticates the user all in the manner described above with respect to steps 602–610 (FIG. 6). In step 1212 (FIG. 12), WPOP 206 (FIG. 2) receives user commands directing display of one or more e-mail message bodies. In step 1214 (FIG. 12), WPOP 206 (FIG. 2) retrieves those e-mail message bodies. WPOP 206 includes the e-mail message bodies as part of a web page for transmission through Internet 160. Display of the web page by the user through use of a conventional web browser displays the e-mail message bodies to the user in step 1216 (FIG. 12). Thus, the user is able to view e-mail messages stored in local database 202 (FIG. 2) through Internet 160.

In step 1218 (FIG. 12), WPOP 206 (FIG. 2) marks the retrieved e-mail messages as read within local database 202 and further updates meta data for the user, e.g., to reflect a change in the number of unread e-mail messages. WPOP 206 stores the updated meta data in local database 202 in step 1220 (FIG. 12).

Centralized Web Access

Figure 13:
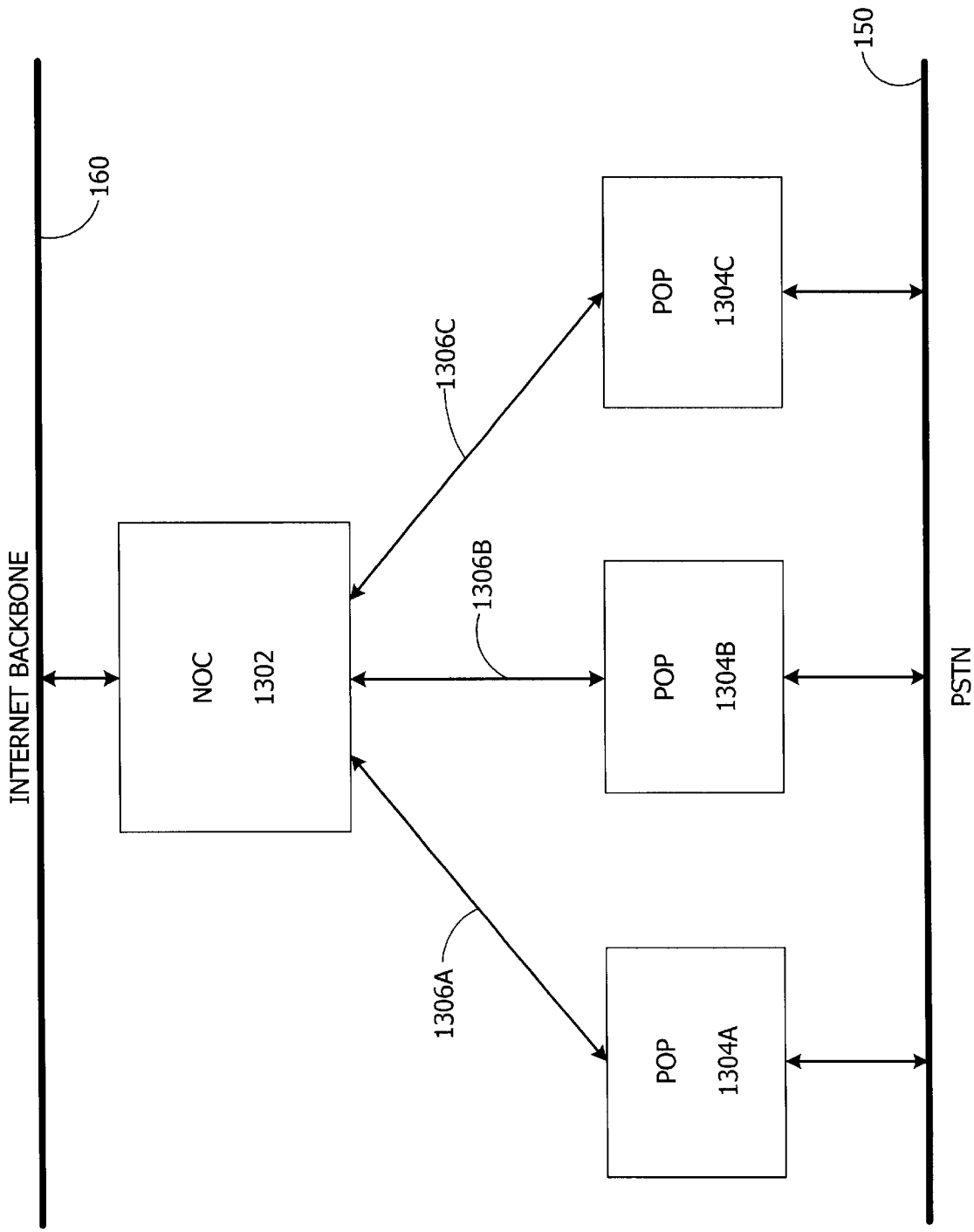
FIG. 13 is a block diagram of a message system further in accordance with the present invention.

An alternative embodiment is shown in FIG. 13 as message system 1300. NOC 1302 is coupled to a number of POPs 1304A–C through respective connections 1306A–C. In addition, only NOC 1302 is coupled to Internet 160. POPs 1304A–C are coupled to PSTN 150. In this alternative embodiment, NOC 1302 handles all access to messages stored in message system 1300 through Internet 160.

Figure 14:
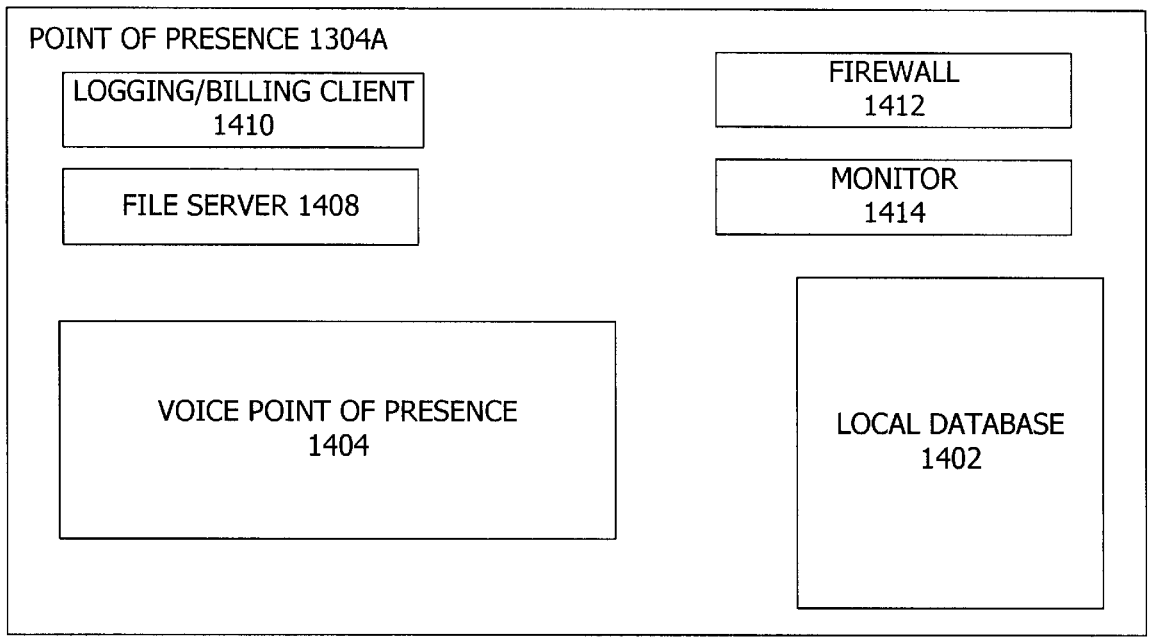
FIG. 14 is a block diagram of a POP of the message system of FIG. 13.

POP 1304A is shown in greater detail in FIG. 14. POP 1304A is generally analogous to POP 104A (FIG. 2) except that POP 1304A (FIG. 14) does not include a WWW point of presence. Instead; only NOC 1302 (FIG. 15) includes a WPOP 1504. In addition, POP 1304A does not include an audio streamer. NOC 1302 (FIG. 15) includes an audio streamer 1512 instead.

POP 1304A (FIG. 14) includes a VPOP 1404 and local database 1402 which are directly analogous to VPOP 204 (FIG. 2) and local database 202, respectively, of POP 104A. In addition, VPOP 1304A (FIG. 14) includes logging/billing client 1410, file server 1408, firewall 1412, and monitor 1414 which are directly analogous to logging/billing client 212 (FIG. 2), file server 210, firewall 214, and monitor 216, respectively, of POP 104A.

Figure 15:
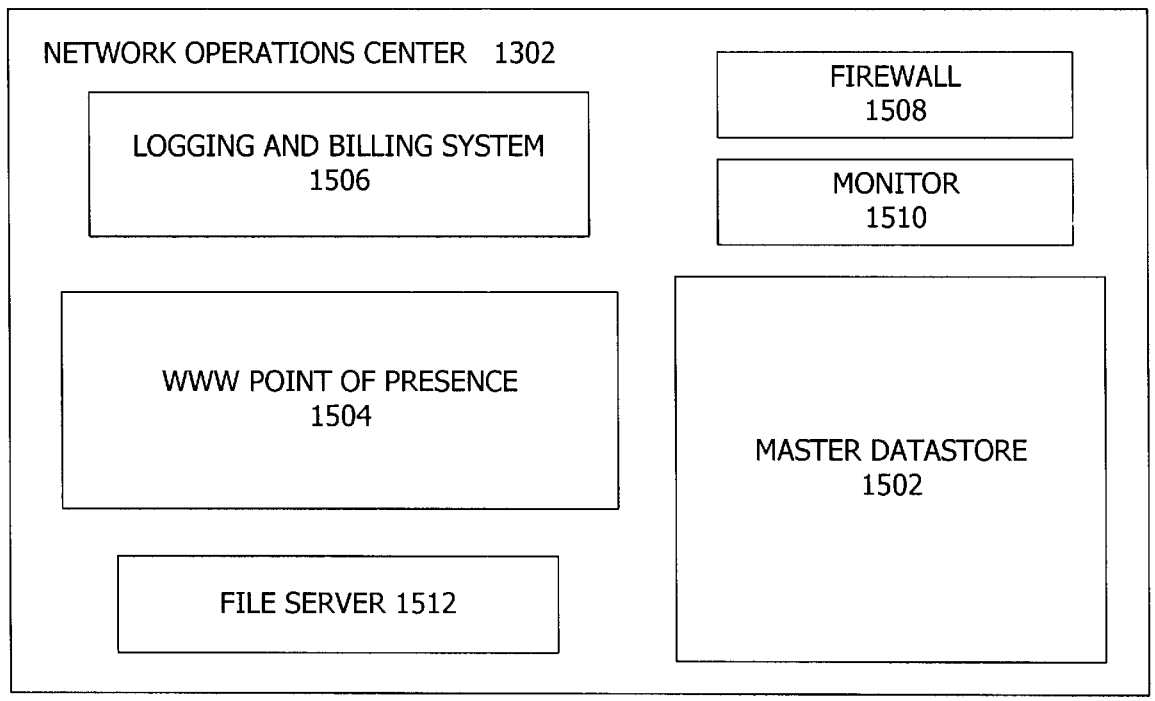
FIG. 15 is a block diagram of a NOC of the message system of FIG. 13.

NOC 1302 (FIG. 13) is shown in greater detail in FIG. 15. As described above, NOC 1302 processes all access to master database 1502 through Internet 160. Accordingly, NOC 1302 includes WPOP 1504 and audio streamer 1512. WPOP 1504 includes a VVN client 1308 which is directly analogous to VVN clients 108A–C (FIG. 1). A redirect web server such as redirect web server 304 (FIG. 3) within NOC 1302 (FIG. 13) is obviated since there are no other WPOPs in message system 1300 (FIG. 13) to which to redirect traffic through Internet 160. NOC 1302 further includes a master database 1502 which is directly analogous to master database 302. In addition, NOC 1302 includes logging and billing system 1506, firewall 1508, and monitor 1510 which are directly analogous to logging and billing system 306 (FIG. 3), firewall 308, and monitor 310, respectively, of NOC 102.

In the embodiment described above and shown in FIG. 1, messages and meta data stored in local database 202 is replicated in master database 302 at a predetermined frequency or as bandwidth permits. In one embodiment, the predetermined frequency is daily. In other alternative embodiments, the predetermined frequency is more frequent, e.g., hourly or even every few minutes. In message system 1300 (FIG. 13), a voice mail message recorded through PSTN 150 and stored in local database 1402 should be immediately available for retrieval through Internet 160 from master database 1502 (FIG. 15). Accordingly, messages and associated meta data as stored in local database 1402 (FIG. 14) and master database 1502 (FIG. 15) are synchronized on an ongoing basis.

In general, the operation of message system 1300 (FIG. 13) is the same as that described above with respect to message system 100. However, there are significant exceptions. One exception is that VPOP 1404 (FIG. 14) immediately sends received and locally stored messages and associated updated meta data through connection 1306A to file server 1512 (FIG. 15). File server 1512 stores the received messages and associated meta data in master database 1502 so that such messages are immediately retrievable through Internet 160. Similarly, e-mail messages which are received and stored in master database 1502 by WPOP 1504 and which are associated with users for whom POP 1304A is the local POP are immediately sent through connection 1306A to file server 1408 for storage in local database 1402. As a result, such e-mail messages are immediately available to the recipient by telephone access through PSTN 150. In an alternative embodiment, only e-mail message meta data are updated in local database 1402 immediately while e-mail message bodies are only retrieved when the recipient is checking e-mail by telephone. Such can be accomplished without excessive delay by initiating retrieval of the message bodies, and/or voice synthesized audio versions thereof, in the pre-fetch of step 1108 (FIG. 11). In addition, connections 1306A–C generally require greater bandwidth to support a number of simultaneous voice communications between VPOPs 1304A–C and VVN client 1308 to thereby enable users to place telephone calls through Internet 160 to VVN client 1308 to VPOPs 1304A–C. and therethrough to intended recipients.

Message system 1300 (FIG. 13) provides a number of advantages over message system 100 (FIG. 1). First, since local database 1402 (FIG. 14) and master database 1502 (FIG. 15) are constantly synchronizing with one another, a failure of POP 1304A can result in, at worst, loss of any data previously stored in local database 1402 and not replicated in master database 1502. That amount of data depends upon the frequency with which local database 1402 and master database 1502 are synchronized and is generally on the order of a few minutes. In other words, at worst, only messages left through PSTN 150 in the few minutes immediately preceding failure of POP 1304A would be lost. In comparison, messages left for an entire day could be lost if POP 104A (FIG. 1) fails since messages and associated meta data stored in local database 202 (FIG. 2) is updated in master database 302 (FIG. 3) generally on a daily basis.

A second advantage is that POP 1304A (FIG. 13) is considerably less complex and less expensive than POP 104A (FIG. 1) since POP 1304A (Figure 13) contains no WWW point of presence. As a result, maintenance costs of POP 1304A are significantly less than corresponding maintenance of POP 104A (FIG. 1). In generally, less hardware and software is executing within POP 1304A (FIG. 13) and, as a result, fewer man-hours are required to supervise operation of POP 1304A. Furthermore, since the graphical user interface implemented by WPOP 206 (FIG. 2) of message system 100 is, in the context of message system 1300 (FIG. 13), located in a single WPOP 1504 (FIG. 15); changes can be made to the graphical user interface in a single location, e.g., WPOP 1504. Conversely, changes in the user interface and/or functionality of the WWW interface of message system 100 (FIG. 1) requires separate and most likely nearly identical modifications to WPOPs in each of POPs 104A–C. While message system 100 is shown to have only three (3) points of presence, it is appreciated that implementation of message system 100 over a large geographical area such as the United States or even internationally would require many more than three (3) points of presence. Accordingly, the added complexity in maintaining a separate WWW point of presence on each message system point of presence can be significant.

Regional Web Access

Figure 16:
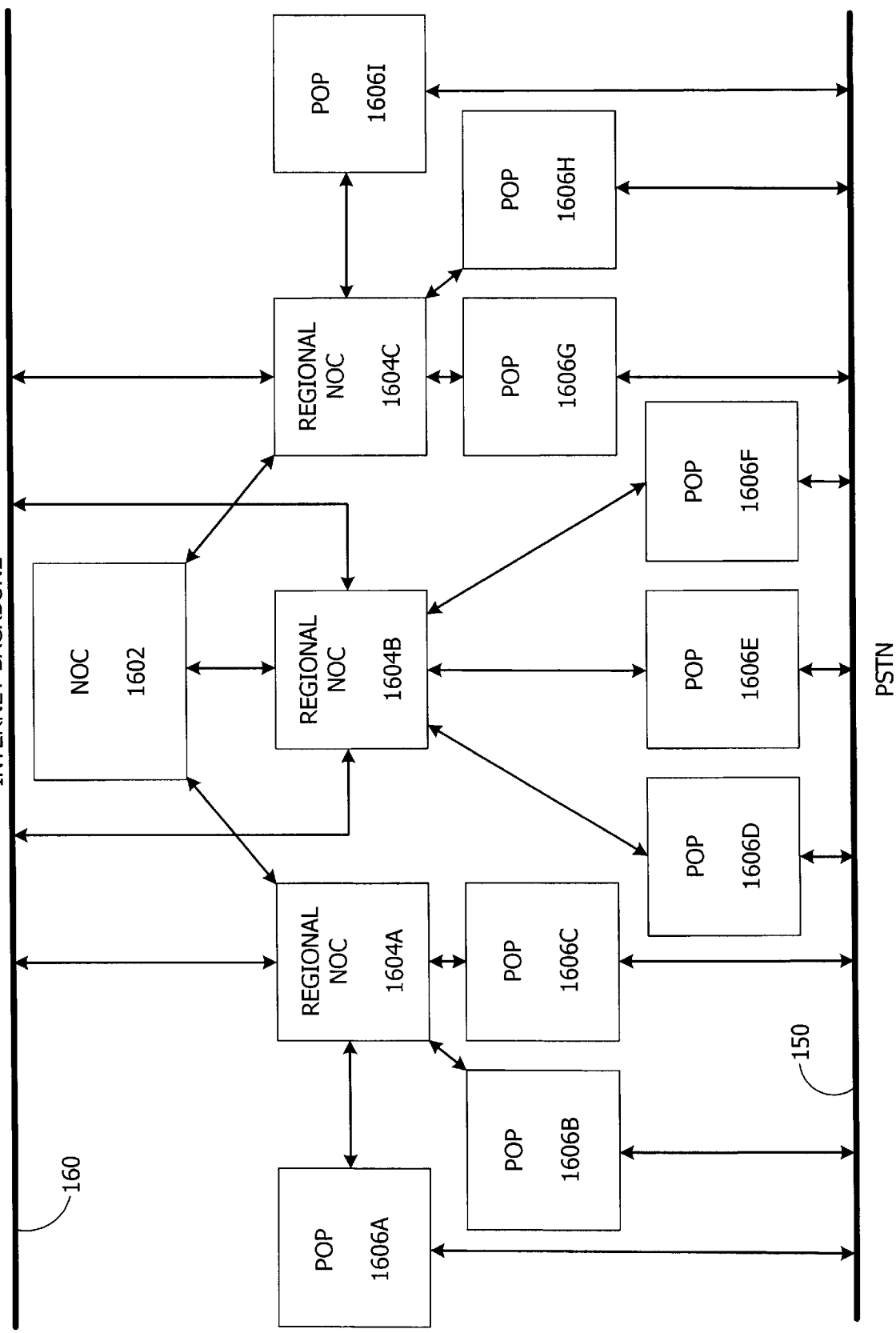
FIG. 16 is a block diagram of a message system further in accordance with the present invention.

One of the disadvantages of message system 1300 (FIG. 13) is that some users may experience an unacceptable amount of latency when accessing NOC 1302 through Internet 160 over great geographical distances. Accordingly, an area the size of the continental United States may be too large to be served adequately by a single NOC such as NOC 1302. To address this problem, message system 1600 (FIG. 16) includes an additional hierarchical layer. Specifically, POPs 1606A–I are generally analogous to POPs 1304A–C (FIG. 13) and NOC 1602 (FIG. 16) is generally analogous to NOC 102 (FIG. 1). Access through Internet 160 in message system 1600 (FIG. 16) is handled by a number of regional NOCs 1604A–C, each of which includes a WWW point of presence while voice points of presences are more widely distributed in POPs 1606A–I. In this embodiment, POPs 1606A–I are directly analogous to POPs 1304A–C (FIG. 13) and the previous description of POP 1304A is equally applicable to POPs 1606A–I (FIG. 16). In addition, NOC 1602 is directly analogous to NOC 102 (FIG. 3). NOC 1602 (Figure 16) differs from NOC 102 (FIG. 3) only in that redirect web server 1804 (FIG. 18) of NOC 1602 redirects access through Internet 160 to one of regional NOCs 1604A–C (FIG. 16) according to the particular user requesting access rather than redirecting to one of POPs 1606A–I.

Regional NOCs 1604A–C are configured to process user access to message databases through Internet 160 and are distributed geographically so as to minimize latency experienced by users accessing message databases through Internet 160. For example, to server the continental United States, regional NOCs 1604A, 1604B, and 1604C can be located in San Francisco, Calif.; Denver, Colo.; and Washington, D.C., respectively. Accordingly, a user can access a regional NOC which is relatively close in geographical terms and therefore minimizes latency experienced by users accessing messages through Internet 160 while a relatively small number of regional NOCs provide coverage for a relative large geographical region, e.g., the continental United States.

Figure 17:
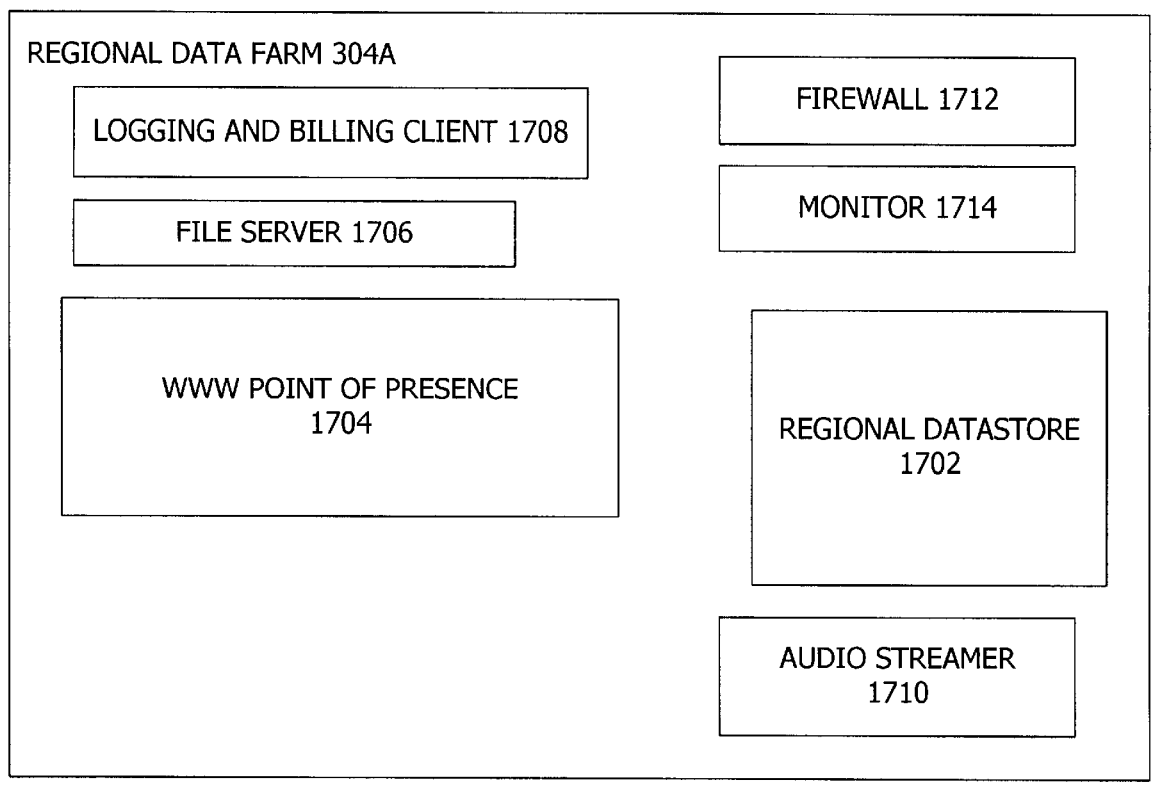
FIG. 17 is a block diagram of a regional NOC of the message system of FIG. 16.

Regional NOC 1604A is representative of regional-NOCs 1604A–C and is shown in greater detail in FIG. 17. Regional NOC 1604A includes a regional database 1702, a WPOP 1704, a file server 1706, a logging/billing client 1708, an audio streamer 1710, a firewall 1712, and a monitor 1714. WPOP 1704, file server 1706, logging/billing client 1708, audio streamer 1710, firewall 1712, and monitor 1714 are directly analogous to WPOP 206 (FIG. 2), file server 210, logging/billing client 212, audio streamer 208, firewall 214, and monitor 216, respectively. Regional database 1702 (FIG. 17) is generally analogous to local database 202 (FIG. 2) and master database 302 (FIG. 3) except that regional database 1702 includes messages and meta data for users of a particular region and therefore includes a superset of the data stored in local database 202 (FIG. 2) and a subset of data stored in master database 302 (FIG. 3).

The advantage of message system 1600 (FIG. 16) is that regional NOCs, e.g., regional NOC 1604A, generally synchronizes message and meta data with POPs, e.g., POP 1606A, frequently such that voice and fax mail messages are quickly accessible through Internet 160 and, conversely, e-mail messages are quickly accessible through PSTN 150 in the manner described above with respect to message system 1300 (FIG. 13). As described above with respect to message system 1300, such provides relatively concurrent data redundancy such that nearly all data can be recovered should a POP or regional NOC fail. However, regional NOCs 1604A–C can be geographically distributed so as to minimize latency experienced during access through Internet 160. In addition, since frequency data synchronization is need only between POPs and a regional NOC which is connected to fewer than all POPs, the bandwidth demands for such frequent updating is less for each regional NOC relative to the bandwidth demands of NOC 1302 which must synchronize with all POPs. Accordingly, less expensive connections with less bandwidth can be used between regional NOC 1604A and POPs 1606A–C, for example, relative to the requisite bandwidth and expense of connections 1306A–C (FIG. 13).

Low Cost, Single-Point Access for Metropolitan Areas

Users of telephones are familiar with charges which are sometimes referred to as "local toll" charges and which are associated with telephone usage within a local region. Such charges can accrue when dialing a telephone served by the same telephone service provider used by the caller but nonetheless requiring more than a single central office. A brief overview of telephone charging schemes aids appreciation and understanding of the benefits of single-point access in accordance with the present invention.

Figure 18:
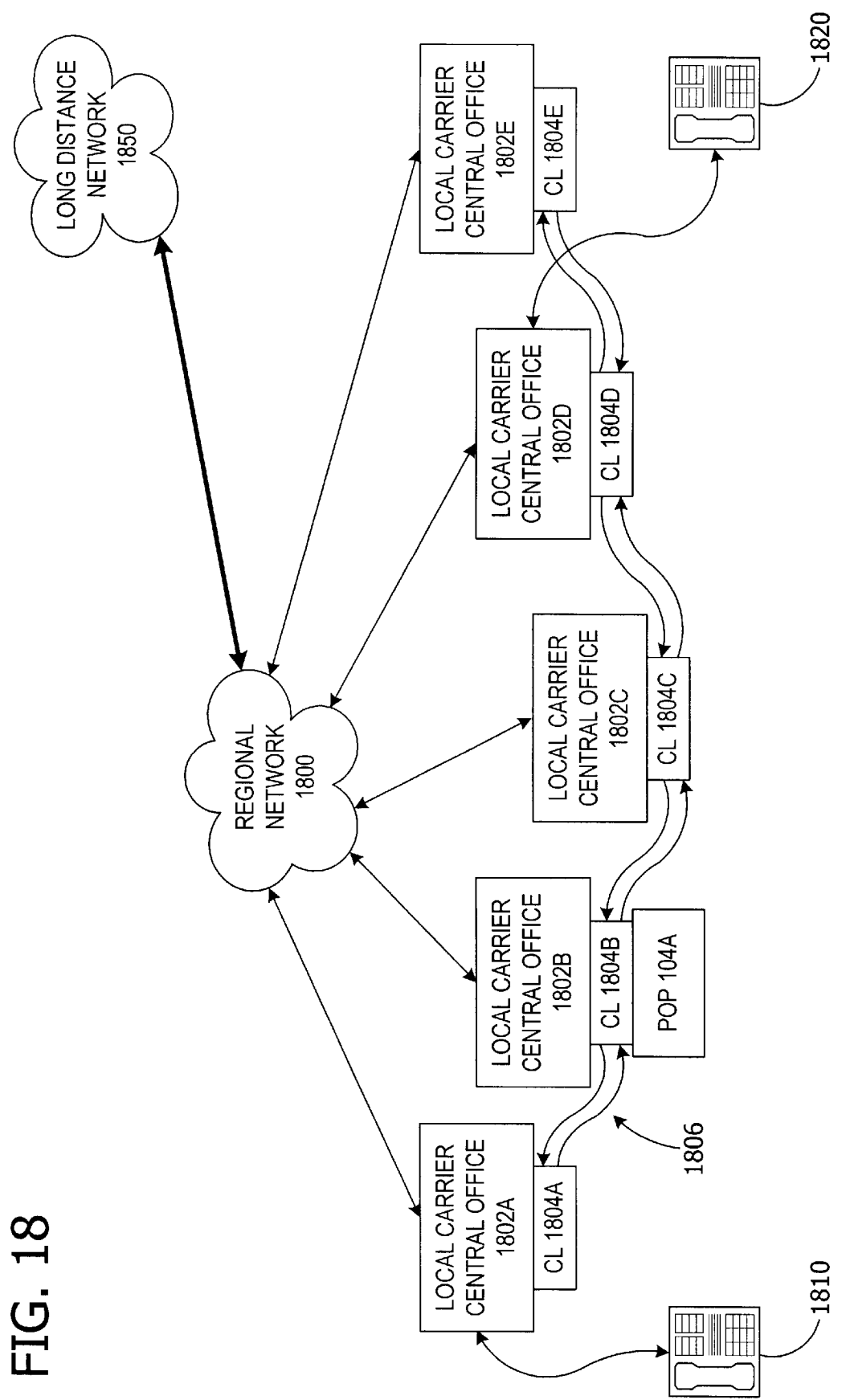
FIG. 18 is a block diagram of a telephony-centric network, a co-located network and a POP of message system in accordance with the present invention.

FIG. 18 shows a regional telephone network 1800 in which a geographical region is served by a number of local carrier central offices 1802A–E. Generally, a telephone call carried on entirely within regional telephone network 1800 is considered a local call, i.e., not a long-distance telephone call. However, such a call can accrue toll charges. In this illustrative example, a telephone call is initiated by telephone equipment 1810, e.g., by dialing a telephone number on a standard, conventional telephone. Telephone equipment 1810 is coupled to local carrier central office 1802A via connection 1808A which can be, for example, a twisted pair of wires. Telephone calls to other telephone equipment coupled directly to local carrier central office 1802A are generally toll-free and the person initiating such a call pays nothing for the call other than regular monthly service charges.

However, local toll charges are accrued if the telephone call involves a second local carrier central office, e.g., local carrier central office 1802D. In this illustrative example, the call initiated through telephone equipment 1810 is directed to telephone equipment 1820 which is coupled to local carrier central office 1802D through connection 1808B. Local carrier central office 1802A routes the call through regional telephone network 1800 to local carrier central office 1802D and therethrough to telephone equipment 1820, charging the person dialing telephone equipment 1810 for the routing of the telephone call through regional telephone network 1800 between local carrier central offices 1802A and 1802D.

Distribution of local telephone service into a number of separate, distributed local carrier central offices poses a particularly troublesome situation for telecommunications services which hope to provide service for an entire region. Specifically, coupling a point of presence such as POP 104A (FIG. 1) at any one of local carrier central offices 1802A–E would result in local toll charges for anyone accessing the point of presence from any other of local carrier central offices 1802A–E. For example, access to POP 104A at local carrier central office 1802B from telephone equipment 1810 through local carrier central office 1802A would require access to connection 1808D of regional telephone network 1800 and thus would incur a local toll. Such local tolls accumulate with repeated access to POP 104A and would make such access unattractive to potential customers of message system 100 (FIG. 1). To provide toll-free access to all users of regional telephone network 1800 (FIG. 18), points of presence would be required at each and every one of local carrier central offices 1802A–E. Such would add significantly to the complexity and cost of a message system such as message system 100 (FIG. 1).

Therefore, in accordance with the present invention, POP 104A (FIGS. 1 and 18) is accessed through a regional area network 1806 which couples a number of local carrier central offices 1802A–E to provide an alternative route from any of local carrier central offices 1802A–E to POP 104A. Regional area network 1806 includes a number of co-located nodes 1804A–E, each of which is co-located with a respective one of local carrier central offices 1802A–E. Local carrier central offices 1802A–E each permit installation of equipment within such local carrier central offices for convenient connection to the public switched telephone network. Each of co-located nodes 1804A–E provide a connection between the public-switched telephone network and regional area network 1806. Thus, regional area network 1806 interconnects local carrier central offices 1802A–E independently of regional telephone network 1800. In one embodiment, regional area network 1806 is a SONET (Synchronous Optical Network) ring. SONET rings are currently in place in most large, metropolitan regions of the United States.

Figure 19:
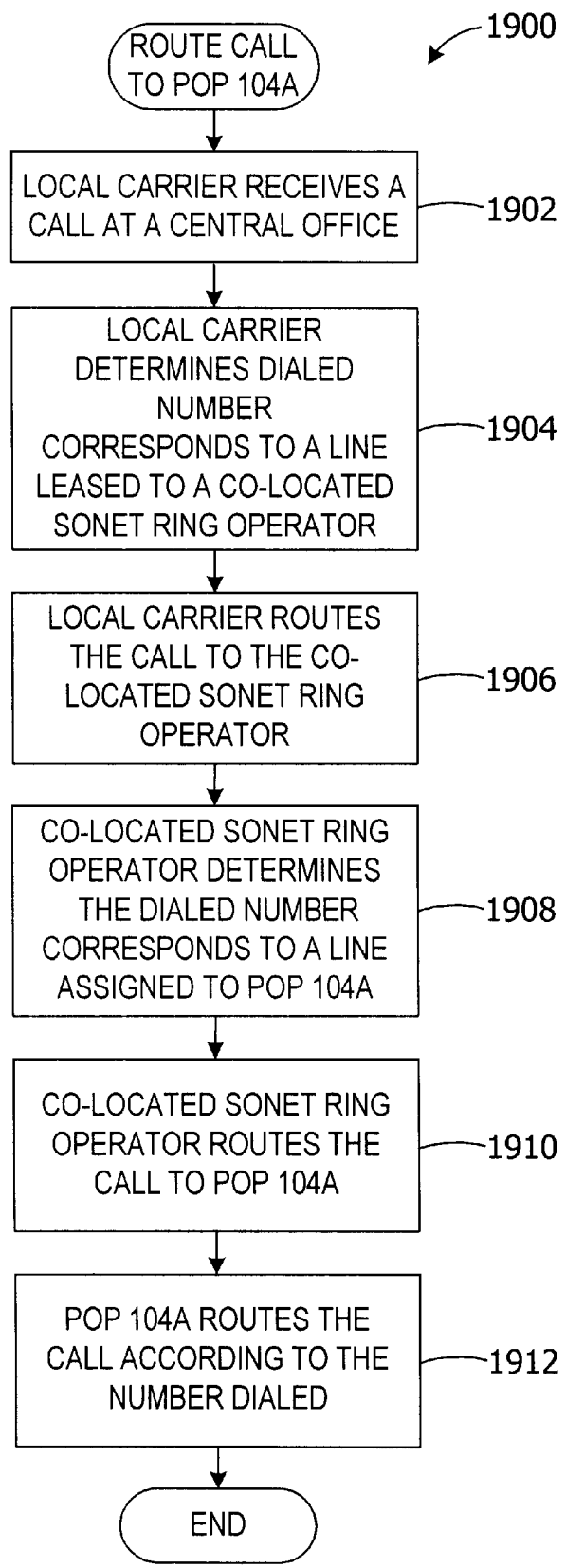
FIG. 19 is a logic flow diagram of the establishing of a telephony-centric network connection through a co-located network in accordance with the present invention.

The advantage of using regional area network 1806 is that data and analog signals, e.g., voice signals, traveling along regional area network 1806 between local carrier central offices 1802A–E do not accrue charges to the end user. Generally, costs for such data and voice signal routing are apportioned between the local carrier as proprietor of local carrier central offices 1802A–E and the proprietor of co-located equipment 1804A–E and regional area network 1806. The following illustrates toll-free routing of a telephone call from telephone equipment 1810 to local POP 104A through regional area network 1806 as represented by logic flow diagram 1900 (FIG. 19).

In step 1902, local carrier central office 1802A (FIG. 18) receives a telephone call from telephone equipment 1810. Typically, data and voice signals are routed through regional network 1806 according to the telephone number with which the data and/or voice signals are associated. Specifically, a number of telephone numbers are reserved to regional area network 1806 and any calls placed to such a telephone number through telephone equipment 1810 are routed by local carrier central office 1802A to co-located equipment 1804A. Accordingly, the telephone number dialed using telephone equipment 1810 is one dedicated to regional area network 1806 and such is determined by local carrier central office 1802A in step 1904 (FIG. 19). In step 1906; local carrier central office 1802A (FIG. 18) routes the call to co-located equipment 1804A.

To receive data and voice signals, a number of telephone numbers allocated to regional area network 1806 are sub-allocated to POP 104A. Thus, co-located equipment 1804A similarly determines to which of co-located equipment 1804A–E the call from telephone equipment 1810 is directed according to the particular telephone number dialed. In step 1908 (FIG. 19), co-located node 1804A determines that the dialed telephone number is allocated to POP 104A and that POP 104A is connected to co-located node 1804B. Co-located node 1804A routes the call through regional area network 1806 to co-located node 1804B and therethrough to POP 104A in step 1910 (FIG. 19).

In step 1912, POP 104A (FIG. 18) routes the telephone call according to the dialed telephone number. As described herein, the dialed telephone number identifies the particular user for whom the telephone call is intended. Thus, according to logic flow diagram 1900 (FIG. 19), calls from any telephone equipment served by telephone network 1800 (FIG. 18) is routed to a single POP without accruing local toll charges to the user. As a result, a single POP can be used to serve a geographically large area with numerous users at reasonable cost.

Outbound telephone calls from POP 104A are similarly routed through regional area network 1806. Regional area network 1806 includes a number of connections which are accessible to POP 104A and which terminate in each of co-located equipment 1804A–E. For example, POP 104A has access to one or more connections through regional area network 1806 which terminate in each of co-located equipment 1804A–E. POP 104A determines to which of local carrier central offices 1802A–E an outbound telephone call is best routed according to the area code and prefix, for example, of the outbound telephone number. For example, a telephone call to telephone equipment 1820 is determined to be best routed through local carrier central office 1802D according to the area code and prefix of the telephone number by which telephone equipment 1820 is reached. To route the call to telephone equipment 1820, POP 104A uses a connection through regional area network 1806 which terminates at co-located equipment 1804D which is co-located with local carrier central office 1802D. Accordingly, the outbound telephone call to telephone equipment 1820 is not routed through regional network 1800 and therefore does not incur a local toll charge.

Exemplary Architecture of Message System 100

Figure 20:
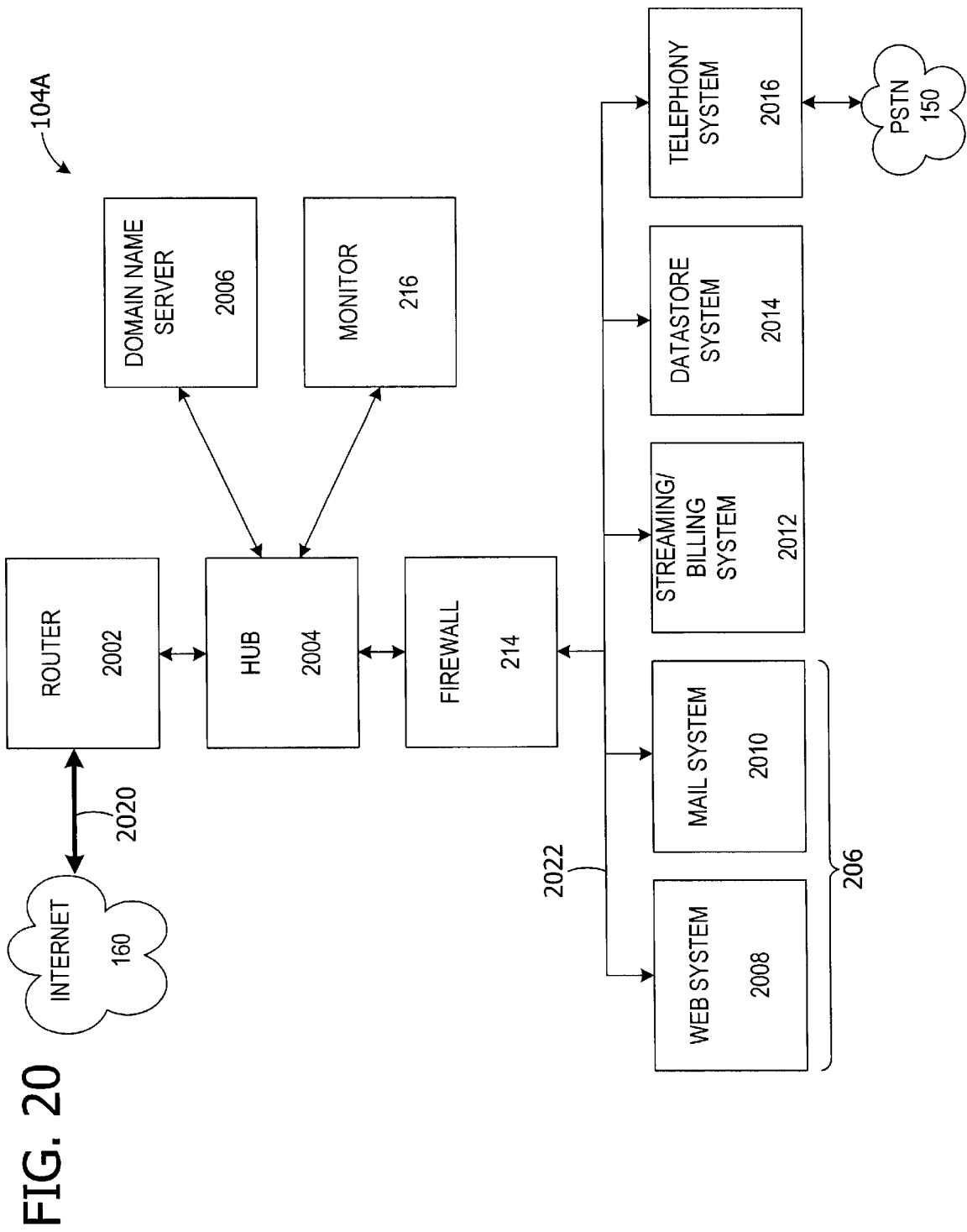
FIG. 20 is a block diagram of a POP of a message system in accordance with the present invention.

FIG. 20 shows an exemplary architecture of POP 104A. POP 104A includes a router 2002 which is coupled to Internet 160 through a data T1 connection 2020. Router 2002 is conventional and routes data traffic of Internet 160 through data T1 connection 2020 in a conventional manner. Router 2002 identifies data whose destination address identifies POP 104A and passes such data to a hub 2004 which is a conventional Internet hub. POP 104A includes a domain name server (DNS) 2006 which translates domain names to specific network addresses in a conventional manner. Monitor 216 monitors performance of POP 104A in the manner described above. In particular, monitor 216 periodically sends a message to each of systems 2008–2016 and each of a number of sub-systems eliciting response messages from each. If a system or sub-system fails to respond within a predetermined amount of time, monitor 216 alerts a system administrator, e.g., through simultaneous paging and e-mail messages, and attempts diagnosis and correction of the system and/or sub-system. Such correction can include, for example, restarting of one or more of systems 2008–2016. In addition, monitor 216 provides remote control to systems 2008–2016 through Internet 160 upon proper authentication of a system administrator to enable the system administrator to issue commands to systems 2008–2016. Such commands can include restarting of any of systems 2008–2016 or any sub-systems thereof.

Firewall 214 restricts access to local area network (LAN) 2022 from Internet 160 in the manner described above and is described in greater detail below. Each of the following systems is implemented in this illustrative embodiment as an autonomous computer coupled to LAN 2022: a web system 2008, a mail system 2010, a streaming and billing system 2012, a datastore system 2014, and a telephony system 2016. Web system 2008 and mail system 2010 collectively form WPOP 206 (FIG. 2). Streaming and billing system 2012 (FIG. 20) includes both audio streamer 208 (FIG. 2) and logging/billing client 212. Datastore system 2014 (FIG. 20) includes local database 202 (FIG. 2). Lastly, telephony system 2016 (FIG. 20) includes VPOP 204 (FIG. 2). Each of the systems coupled to LAN 2022 is described more completely below.

Figure 21:
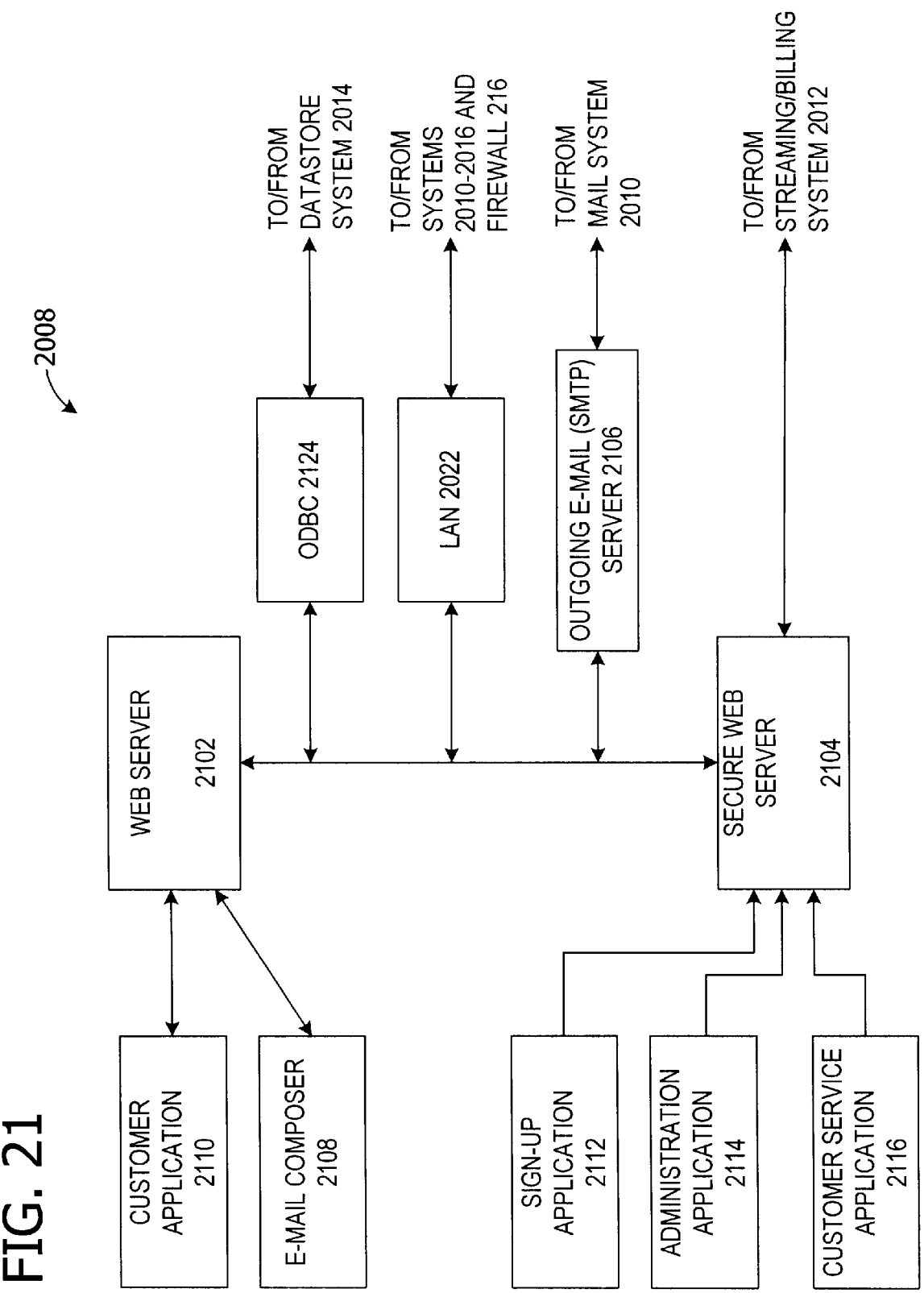
FIG. 21 is a block diagram of a web system of the POP of FIG. 20.

Web system 2008 is shown in greater detail in FIG. 21. Web system 2008 includes a web server 2102 and a secure web server 2104. In one embodiment, web server 2102 and secure web server 2104 are parts of Internet Information Server (IIS) version 4.0 which is available from Microsoft Corporation of Redmond, Washington. Web server 2102 serves requests for HTML documents according to the Hypertext Transport Protocol (HTTP) and secure web server 2104 serves requests for HTML documents according to the Secure Hypertext Transport Protocol (HTTPS). A number of applications 2110–2116 implement the user interface by which users interact with web system 2008 through Internet 160. Applications 2110–2116 are each all or part of one or more computer processes executing within web system 2008. Applications 2110–2116 include computer instructions which are defined by, in this illustrative embodiment, HTML documents, CGI scripts, and data which collectively specify forms and graphical user interface constructs which, when displayed and processed by a conventional HTML browser, e.g., Microsoft's Internet Explorer or Netscape's Navigator, provide an interface by which a user can interact with web system 2008. As a result, changes can be made to applications 2110–2116 locally and can be maintained easily without requiring any update of software installed on numerous remote computers by which users can access message system 100 (FIG. 1). In addition, avoiding a requirement of special software other than a conventional HTML browser allows users to access messages when away from home, e.g., by using a computer of a friend or a publicly available computer with a HTML browser such as computers frequently found at schools and public libraries.

Applications 2110–2116 include a customer application 2110, a signup application 2112, an administration application 2114, and a customer service application 2116. Customer application 2110 implements a user interface by which a user can access voice, fax, and e-mail messages. Customer application 2110 implements standard features of commonly available full-featured e-mail readers including the ability to read e-mail messages, decode files attached to e-mail messages, create logical folders into which to place and organize stored e-mail messages, manage contact information including addresses, telephone numbers, and e-mail addresses, and configure e-mail message filters. Customer application 2110 allows a user to use many of the information management mechanisms of full-featured e-mail clients to similarly organize voice mail messages and fax mail messages.

Signup application 2112 implements a user interface by which a new user is prompted to enter information necessary to the creation of a new message account. Such information can include contact information of the user, user identification such as an e-mail address, access telephone numbers, and data specifying automatic payment arrangements. In accordance with the user interface implemented by signup application 2112 and data specified by the user, secure web server 2104 sends data through LAN 2022 to datastore system 2014 for inclusion in local database 202 (FIG. 2). During a subsequent synchronization, such data is also included in master database 302 (FIG. 3).

Administration application 2114 is similar to signup application 2112 with the exception that the user is permitted greater flexibility in the specific information to be specified and the order in which information is specified. In other words, while signup application 2112 can prompt the user for specific information in a specific order to establish the minimum requisite information for creation of a message account, administration application 2114 permits the user to review various types of information regarding the user's message account and to select specific items of information to modify.

Customer service application 2116 implements a user interface by which a user can seek assistance in the usage of message system 100, particularly through web system 2008. Customer service application 2116 can include, for example, answers to frequently asked questions, an on-line user's guide, and a user interface for sending bug reports, questions, and suggestions for improvements to a customer service representative by e-mail.

Web system 2008 also includes an e-mail composer 2108 which is an application similar to applications 2110–2116. E-mail composer 2108 includes HTML documents, forms, and CGI scripts which collectively implement, through a conventional HTML browser, a user interface by which a user can compose an e-mail message. For example, the user can specify one or more recipient e-mail addresses, one or more carbon-copy e-mail addresses, a textual subject, a textual body, one or more files to be attached, and a level of priority. In addition, all e-mail addresses can be specified by reference to address book entries for the user composing the message. Such address book entries are retrieved from datastore system 2014 and displayed for the user by e-mail composer 2108 for selection using conventional graphical user interface techniques. When an e-mail message is completely composed, the user directs that the message be sent. E-mail composer 2108 converts the data specified by the user into the form of an e-mail message suitable for processing according to the simple mail transport protocol (SMTP). In one embodiment, the form of the e-mail message comports with the MIME (Multipurpose Internet Mail Extensions) extension to SMTP. E-mail composer 2108 forwards the converted e-mail message to an outgoing mail server 2106. Outgoing e-mail server 2106 forwards the e-mail message to mail system 2010 which processes the message in a manner described more completely below.

As mentioned briefly above, signup application 2112 allows the user to specify automatic payment arrangements, e.g., a credit card to which usage can be charged. Secure web server 2106 forwards information regarding such payment arrangements to streaming/billing system 2012 which in turn verifies the authenticity of such information using conventional credit card authentication techniques. Logging/billing client 212 (FIG. 2) of streaming/billing system 2012 (FIG. 21) is described in greater detail below.

Access by web system 2008 to and from datastore system 2014 is through Open Database Connectivity (ODBC) 2124. ODBC is a standard, open application programming interface (API) for accessing a database.

Web system 2008 further includes VVN client 108A which is coupled to LAN 2022 and therethrough to firewall 216 and eventually Internet 160. VVN client 108A supports voice communication through Internet 160 according to known, conventional protocols such as those supported by the currently available CU See Me and Internet Phone voice communication software products. Once voice communication through Internet 160 is established conventionally with a remote VVN client, VVN client 108A passes all voice communication through LAN 2022 to telephony servers 2602 (FIG. 26) of telephony system 2016 which are described below in greater detail. Telephony servers 2602 process such forwarded voice communication as if such voice communication was through PSTN 150.

Figure 22:
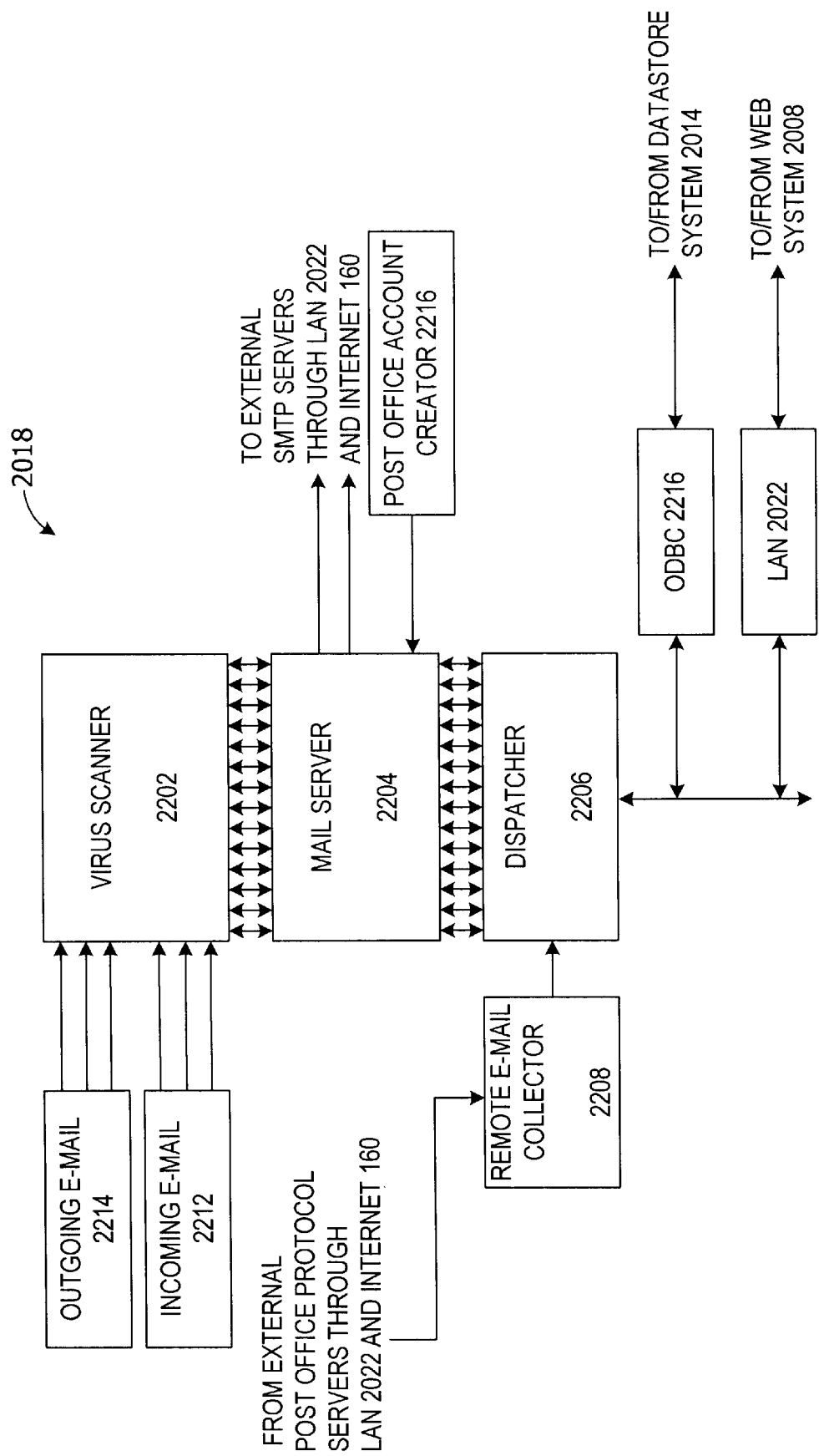
FIG. 22 is a block diagram of a mail system of the POP of FIG. 20.

While web system 2008 (FIG. 20) processes access by a user through Internet 160, mail system 2010 processes and routes e-mail messages and forms another part of WPOP 206. Mail system 2010 is shown in greater detail in FIG. 22.

Mail system 2010 receives outgoing mail 2214 from web system 2008 and incoming mail 2212 from router 2002 (FIG. 20) through hub 2004 and firewall 214. While much access which threatens the security and integrity of POP 104A is thwarted by firewall 214, e-mail messages can sometimes include attachments which are infected with viruses which pose threats to the security and integrity of the recipient's computer system. According, outgoing mail 2214 (FIG. 22) and incoming mail 2212 are processed through a virus scanner 2202. Virus scanner 2202 is conventional and is, in one embodiment, the WebShield virus scanner available from Network Associates, Inc. of Santa Clara, Calif. Any detected viruses within an e-mail message are removed prior to allowing processing of the e-mail message to continue.

Virus scanner 2202 passes all e-mail messages after such scanning and virus removal to a mail server 2204. Mail server 2204 implements conventional e-mail transport protocols such as the Post Office Protocol for incoming e-mail and the Simple Mail Transport Protocol (SMTP) for outgoing e-mail. Mail server 2204 stores incoming e-mail messages in a dispatcher 2206 which forwards the e-mail messages to datastore system 2014 for storage in local database 202 (FIG. 2). As described above, data in local database 202 is eventually synchronized with master database 302 providing redundancy for fault tolerance.

Dispatcher 2206 also receives incoming e-mail messages from a remote e-mail collector 2208. Remote e-mail collector 2208 retrieves e-mail messages from one or more e-mail servers on remote computer systems. For example, if-a user has an e-mail account which is independent of message system 100 and which is sometimes referred to as the remote e-mail account, the user can provide data specifying the remote e-mail account and message system 100, in particular remote e-mail collector 2208, periodically retrieves e-mail messages from the remote e-mail account from remote Post Office Protocol servers 2210 and includes such e-mail messages with other messages for the user as stored within datastore system 2014.

Mail server 2204 forwards outgoing e-mail messages through Internet 160 to external SMTP servers 2218 for distribution to recipient users. A Post Office account creator 2216 creates new e-mail accounts within mail server 2204 in accordance with data provided by signup application 2112 (FIG. 21) or, alternatively, data provided by a system administrator using conventional data entry and user interface techniques. Thus, new accounts can be created automatically for new users signing up or by human intervention for special purpose e-mail accounts or for general maintenance thereby providing flexibility.

Figure 23:
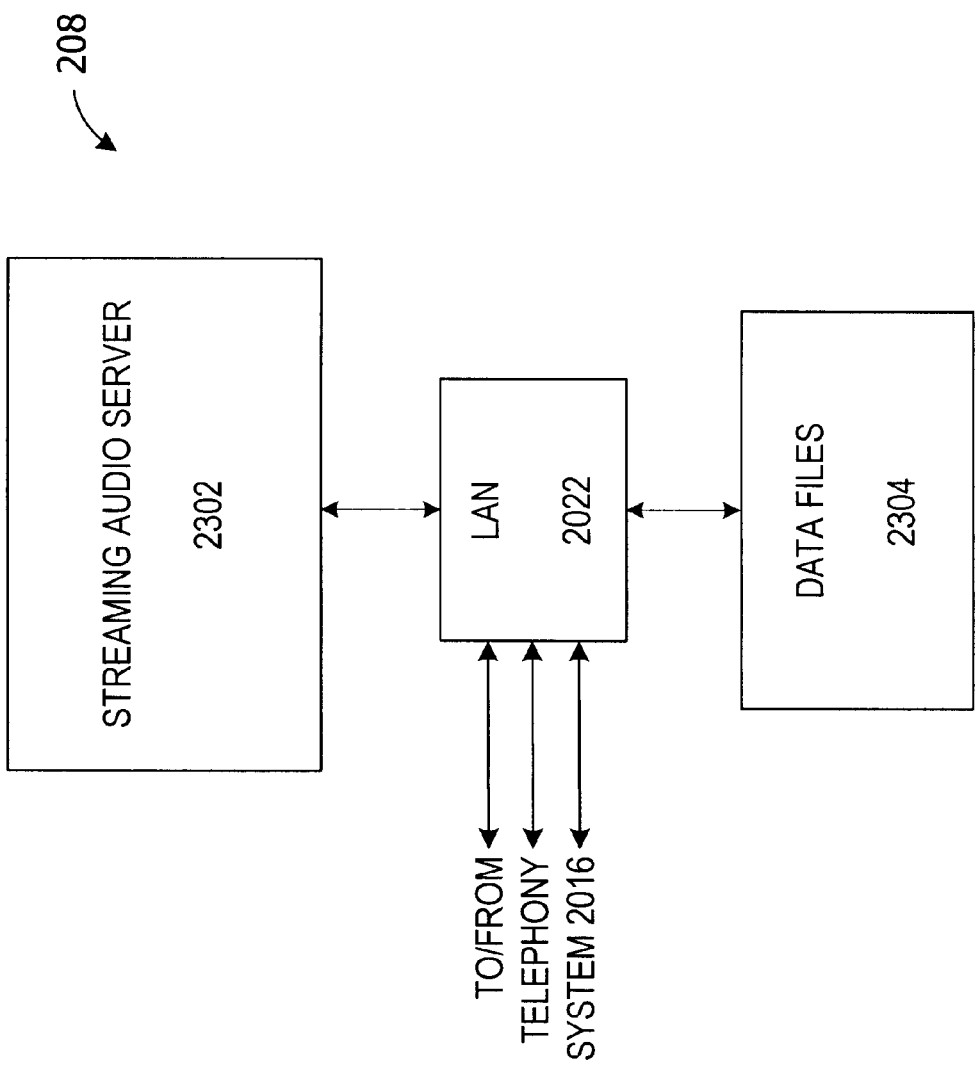
FIG. 23 is a block diagram of a audio streamer system of the POP of FIG. 20.

Steaming/billing system 2014 includes audio streamer 208 (FIG. 2) and logging/billing system 212. Audio streamer 208 is shown in greater detail in FIG. 23, and logging/billing system is shown in greater detail in FIG. 24.

Audio streamer 208 includes a streaming audio server 2302 which receives analog audio signals, e.g., a human voice, through LAN 2022 from telephony system 2016 and forms digital data files 2304 representing the received analog audio signal. Data files 2304 are stored in local database 202 within datastore system 2014. In this illustrative embodiment, data files 2304 are formatted in a streamable format. Accordingly, playback of the substantive content of data files 2304 can begin once a beginning portion of data files 2304 is received by a client computer system while other subsequent portions of data files 2304 are in transit from audio streamer 208 to the client computer system. Latency in playback of audio content of data files 2304 is thereby minimized. When a user directs that a voice mail message stored in data files 2304 be played back through Internet 160, streaming audio server 2302 retrieves data representing the body of the message in the streamable format from data files 2304 and streams the retrieved data through Internet 160 to the users in a conventional manner. In one embodiment, streaming audio server 2302 is the Real Audio streaming audio server available from RealNetworks, Inc. of Seattle, Wash., and data files 2304 store data representing message bodies in the Real Audio format supported by the Real Audio streaming audio server.

Figure 24:
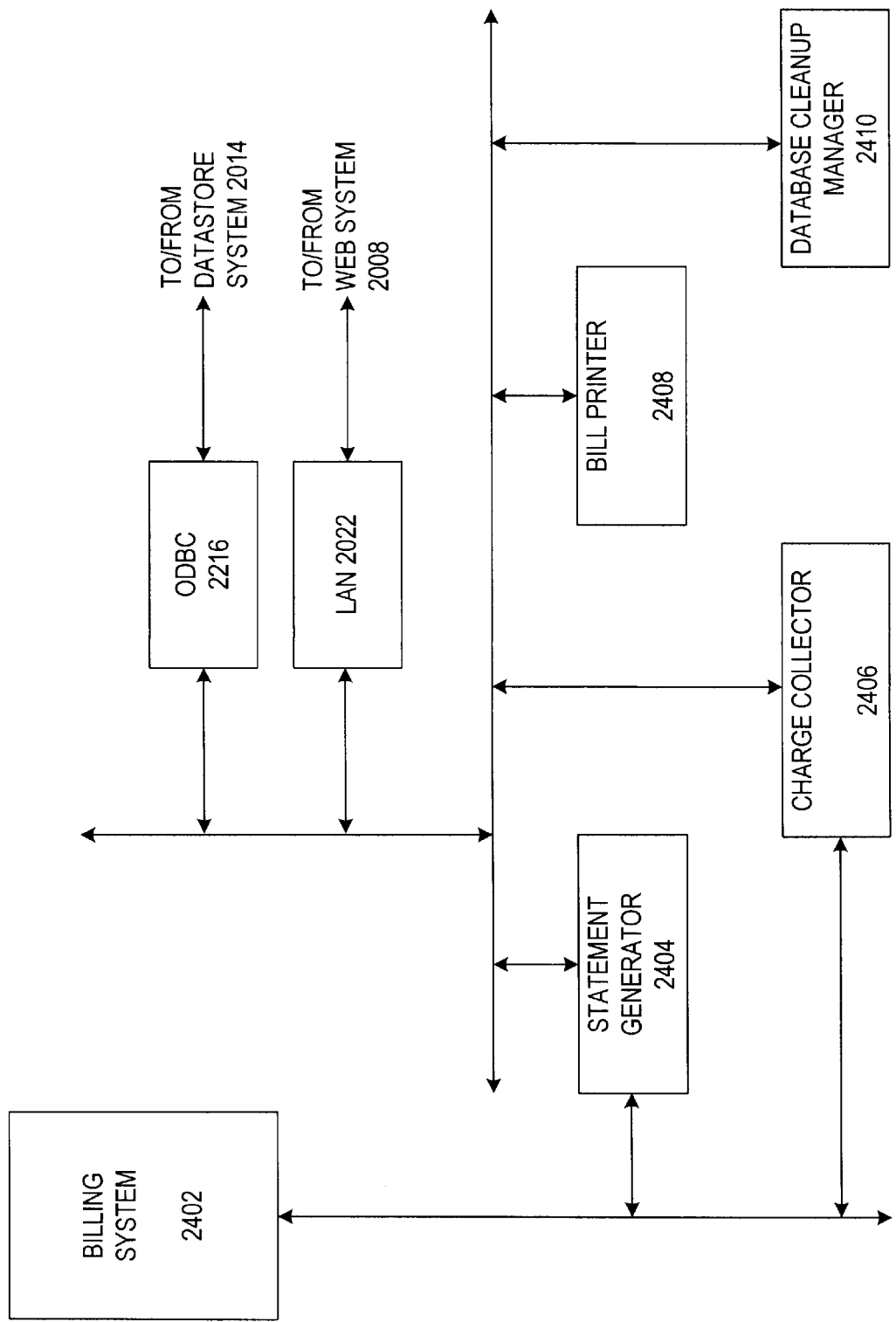
FIG. 24 is a block diagram of a logging/billing system of the POP of FIG. 20.

Logging/billing client 212 is shown in greater detail in FIG. 24. Logging/billing client 212 includes a billing system 2402 which charges users for use of message system 100, for example, by charging credit accounts through secure data transactions through Internet 160. In one embodiment, billing system 2402 is the PaymentNet billing system available from Payment, Inc. of Pleasanton, Calif. Logging/billing client 212 also includes a statement generator which retrieves billing information from billing system 2402 and reports such information to users of message system 100 in the form of messages, e.g., e-mail messages or fax messages. The particular form of message for reporting such information to a particular user is specified by the user and is represented in meta data pertaining to the particular user as stored in datastore system 2014. Charge collector 2406 tracks charges accruing for use of message system 100 (FIG. 1) and reports such charges to billing system 2402. Bill printer 2408 generates printed billing statements for selected user who prefer a printed and mailed billing statement rather than a message as prepared by statement generator 2404. Database cleanup manager 2410 periodically scans local database 202 (FIG. 25) through datastore system 2014 for, and removes, data items which have been marked as deleted but, for performance reasons, have not been removed from local database 202. Such data items can include for example bodies of deleted messages.

Figure 25:
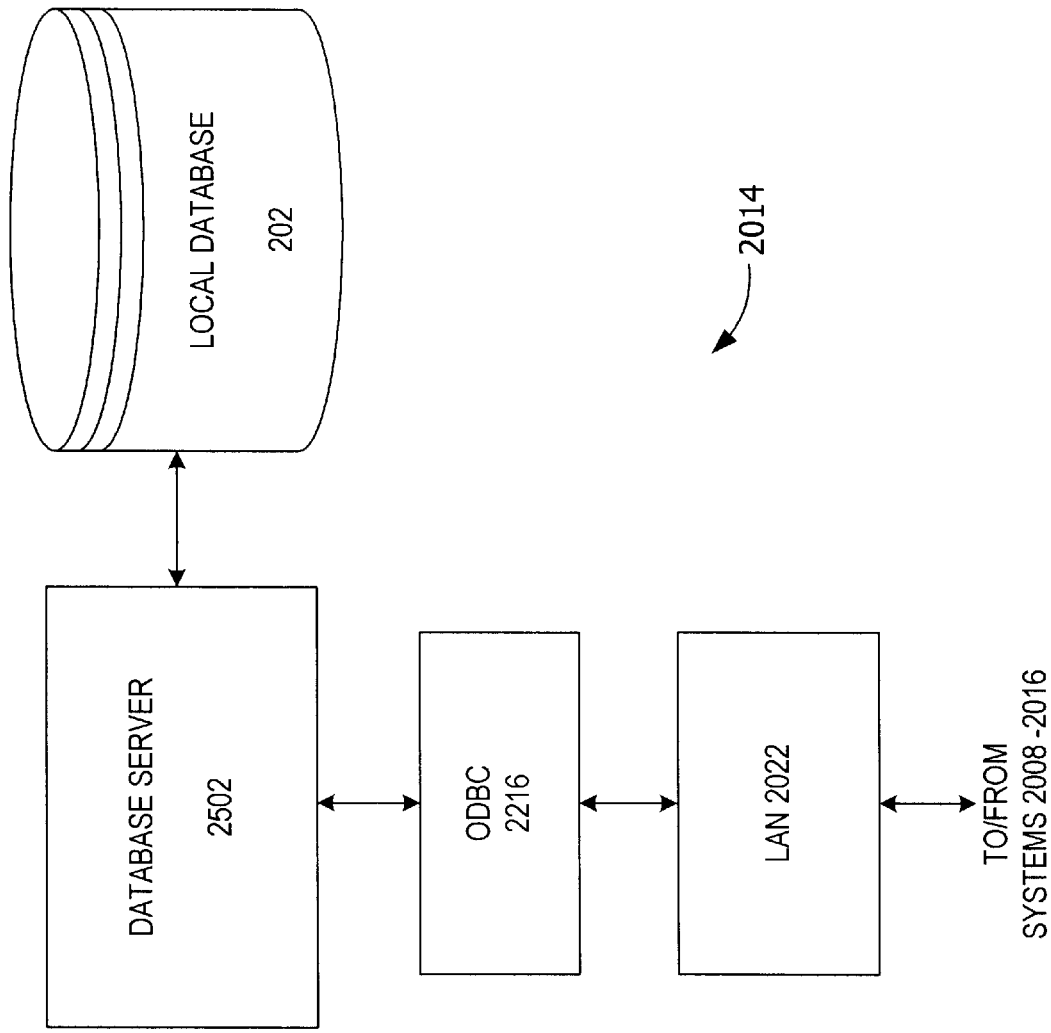
FIG. 25 is a block diagram of a datastore system of the POP of FIG. 20.

Datastore system 2014 is shown in greater detail in FIG. 25 and includes local database 202 (FIG. 2). Datastore system 2014 serves requests for access to local database 202 from web system 2008, mail system 2010, streaming/billing system 2014, and telephony system 2016 through LAN 2022. Such requests comport with a structured query language (SQL) in this illustrative embodiment. For example, database server 2502 can be the Microsoft SQL v6.5 SQL server available from Microsoft Corporation of Redmond, Wash.

Figure 26:
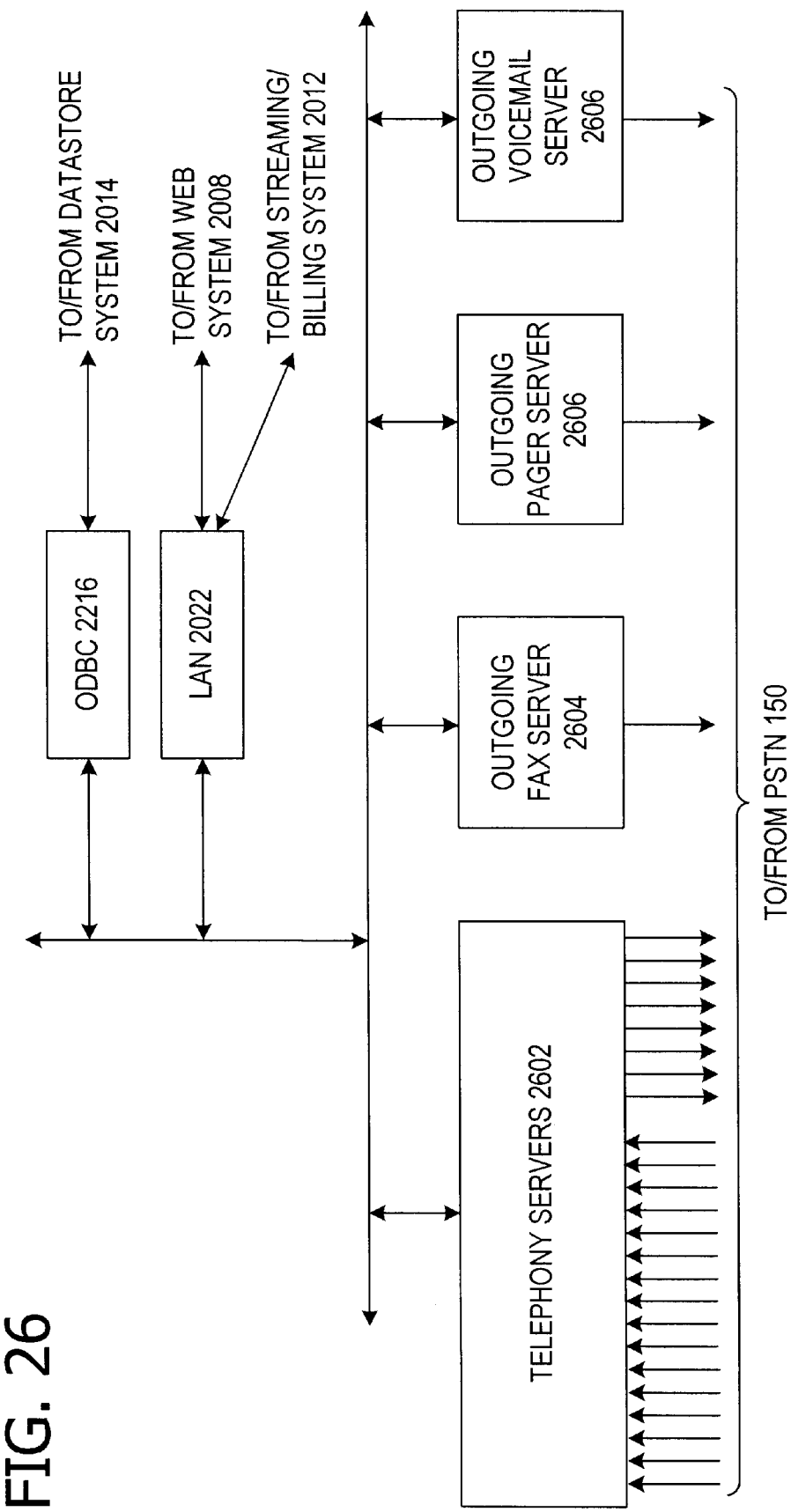
FIG. 26 is a block diagram of a telephony system of the POP of FIG. 20.

Telephony system 2016 is shown in greater detail in FIG. 26. Telephony system 2016 includes telephony servers 2602 which process user access through PSTN 150. Each telephony server includes a number of telephone lines coupled to a telephone processing board, e.g., the Dialogic telephone processing board available from Dialogic Corporation of Parsippany, N.J. In this illustrative embodiment, telephony servers 2602 include thirty-two incoming telephone lines and thirteen outgoing telephone lines. In one embodiment, the incoming telephone lines are a super trunk group such that the incoming telephone lines are not assigned directly to specific telephone processing boards. Instead, incoming telephone lines are assigned to specific telephone processing boards dynamically as needed for each telephone call received through the incoming telephone lines. Such allows telephony system 2016 to provide greater availability to a larger number of users using a smaller number of telephone processing boards.

The incoming telephone lines receive telephone calls through PSTN 150. Users dialing in through PSTN 150 can leave a voice message or can issue commands in the form of voice commands by speaking or in the form of dual-tone, multiple frequency (DTMF) commands by pressing buttons on a touch tone telephone. The commands can direct telephony system 2016 to perform a number of functions including without limitation (i) place an outside call, (ii) forward a stored fax mail message to a particular fax telephone number, (iii) page someone, and (iv) forwarding a voice mail message to a designated recipient.

Telephony servers 2602 place outside calls, i.e., calls to recipients outside message system 100, through the thirteen outgoing telephone lines to PSTN 150. Telephony system 2016 includes outgoing fax servers 2604 which send previously stored fax mail messages to external fax telephone numbers through PSTN 150. Telephony system 2016 includes outgoing page servers 2606 which send page messages through PSTN 150 in generally the same conventional manner a person would—by dialing a pager access telephone number and providing a DTMF message to be displayed on the recipient's pager. Telephony, system 2016 includes outgoing voice mail servers 2608 which send previously stored voice mail messages by dialing a voice mail telephone number and playing the previously stored voice mail message for storage in the remote voice mail message system.

Telephony servers 2602 further receive voice communications through LAN 2022 from VVN client 108A. Telephony servers 2602 processes audio signals received through LAN 2022 from VVN client 108A as if those audio signals were received through PSTN 150. Accordingly, telephony servers respond to voice commands and DTMF commands received through VVN client 108A in the same manner in which such commands received through PSTN 150 are processed. In one embodiment, the conventional remote VVN client can generate such DTMF signals and pass the DTMF signals through Internet 160 as audio signals. Such DTMF signals are simply forwarded by VVN client 108A to telephony servers 2602 as integral components of the forwarded audio signal. In an alternative embodiment, VVN client 108A receives digital commands from the remote VVN client, e.g., representing pressing of a keypad key by the remote user, and converts those commands to representative DTMF signals and forwards them to telephony servers 2602. In a third alternative embodiment, VNN client 108A passes such digital commands to telephony servers 2602 which recognize such digital commands independently of DTWF signals and responds accordingly.

One of the commands to which telephony servers 2602 respond directs that a call be established through PSTN 150 through outgoing telephone lines of telephony servers 2602. Such a command can be issued either (a) through PSTN 150 via voice and/or DTMF signals or (b) through Internet 160 via VVN client 108A using voice, DTMF, and/or digital command signals. In particular, telephony servers 2602 provide a gateway between voice communication through Internet 160 and voice communication through PSTN 150 such that a voice call can be placed through Internet 160 notwithstanding lack of an operating and connected VVN client for the intended recipient. In our example above, the traveling businesswoman can place telephone calls through VVN client 108A as if the businesswoman were calling from her home office with calls that are local to her home office incur only local telephone charges. In addition, telephony servers 2602 allow for other calling features such as conference calls enabling the traveling business woman to set up conference calls from Milan notwithstanding limited telephone equipment available to her.

The above description is illustrative only and is not limiting. The present invention is limited only by the claims which follow.

What is claimed is:

1. A method for facilitating communication through an integrated message system through both a telephony-centric network and a data-centric network, the method comprising:

receiving a request for an analog audio communication link through the data-centric network;

establishing the analog audio communication link through the data-centric network to the message system;

authenticating a user of the integrated message system through the analog audio communication link;

receiving commands through the analog audio communication link requesting one or more previously stored messages intended for the user;

communicating the previously stored messages through the analog audio communication link;

receiving commands through the analog audio communication link requesting a second analog audio communication link through the telephony-centric network;

establishing the second analog audio communication link through the telephony-centric network; and coupling the first-mentioned and the second analog audio communication links such that analog audio communication passes through both the first and second analog audio communication links.

2. A computer system comprising:

a processor;

a memory operatively coupled to the processor; and a record storage module (i) which executes in the processor from the memory and (ii) which, when executed by the processor, causes the computer to facilitate communication through an integrated message system through both a telephony-centric network and a data-centric network by:

receiving a request for an analog audio communication link through the data-centric network;

establishing the analog audio communication link through the data-centric network to the message system;

authenticating a user of the integrated message system through the analog audio communication link;

receiving commands through the analog audio communication link requesting one or more previously stored messages intended for the user;

communicating the previously stored messages through the analog audio communication link;

receiving commands through the analog audio communication link requesting a second analog audio communication link through the telephony-centric network;

establishing the second analog audio communication link through the telephony-centric network; and coupling the first-mentioned and the second analog audio communication links such that analog audio communication passes through both the first and second analog audio communication links.

\* \* \* \* \*